(12) United States Patent
Yamazaki

(10) Patent No.: US 11,911,970 B2
(45) Date of Patent: Feb. 27, 2024

(54) METHOD FOR MANUFACTURING THREE-DIMENSIONAL SHAPED OBJECT, INFORMATION PROCESSING DEVICE, AND THREE-DIMENSIONAL SHAPING DEVICE

(71) Applicant: SEIKO EPSON CORPORATION, Tokyo (JP)

(72) Inventor: Shigeru Yamazaki, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/485,688

(22) Filed: Sep. 27, 2021

(65) Prior Publication Data

US 2022/0097310 A1 Mar. 31, 2022

(30) Foreign Application Priority Data

Sep. 29, 2020 (JP) ................................. 2020-163397

(51) Int. Cl.
| | |
|---|---|
| *B29C 64/393* | (2017.01) |
| *B29C 64/118* | (2017.01) |
| *B33Y 10/00* | (2015.01) |
| *B33Y 30/00* | (2015.01) |
| *B33Y 50/02* | (2015.01) |

(52) U.S. Cl.
CPC .......... *B29C 64/393* (2017.08); *B29C 64/118* (2017.08); *B33Y 10/00* (2014.12); *B33Y 30/00* (2014.12); *B33Y 50/02* (2014.12)

(58) Field of Classification Search
None
See application file for complete search history.

(56) References Cited

U.S. PATENT DOCUMENTS

| | | | |
|---|---|---|---|
| 7,555,357 B2 * | 6/2009 | Holzwarth | ............ B29C 64/106 |
| | | | 700/98 |
| 2007/0179657 A1 | 8/2007 | Holzwarth | |
| 2017/0165920 A1 * | 6/2017 | Leavitt | .................. B29C 64/118 |

(Continued)

FOREIGN PATENT DOCUMENTS

| | | |
|---|---|---|
| EP | 3 750 689 A1 | 12/2020 |
| JP | 2009-525207 A | 7/2009 |

(Continued)

*Primary Examiner* — Yung-Sheng M Tsui
(74) *Attorney, Agent, or Firm* — Global IP Counselors, LLP

(57) ABSTRACT

A method for manufacturing a three-dimensional shaped object includes a first step of specifying a gap portion sandwiched between a first partial path and a second partial path to which a shaping material is discharged from a discharge unit after the first partial path, based on first data including path data representing a path in which the discharge unit moves while discharging the shaping material by a plurality of partial paths, and including discharge control data including at least one of discharge amount information representing a discharge amount of the shaping material in each partial path and movement speed information representing a movement speed of the discharge unit in each partial path, and a second step of, when the gap portion is specified, generating second data from the first data by changing the discharge control data corresponding to the first partial path such that a width of the shaping material deposited on the stage in the first partial path increases.

15 Claims, 14 Drawing Sheets

(56) References Cited

U.S. PATENT DOCUMENTS

2017/0266884 A1* 9/2017 Maeda ................. H04N 1/4092
2020/0376771 A1* 12/2020 Maeda ................... B33Y 40/00
2021/0245426 A1* 8/2021 Yamazaki ............. B29C 64/209

FOREIGN PATENT DOCUMENTS

| JP | 2017-165041 A | | 9/2017 | |
|----|----|----|----|----|
| JP | 2018-176597 A | | 11/2018 | |
| JP | 2019-025761 A | | 2/2019 | |
| JP | 2019025761 A | * | 2/2019 | |
| JP | 2019-136923 A | | 8/2019 | |
| WO | WO-2021011335 A1 | * | 1/2021 | .............. B22F 10/18 |

* cited by examiner

METHOD FOR MANUFACTURING THREE-DIMENSIONAL SHAPED OBJECT, INFORMATION PROCESSING DEVICE, AND THREE-DIMENSIONAL SHAPING DEVICE

The present application is based on, and claims priority from JP Application Serial Number 2020-163397, filed Sep. 29, 2020, the disclosure of which is hereby incorporated by reference herein in its entirety.

BACKGROUND

1. Technical Field

The present disclosure relates to a method for manufacturing a three-dimensional shaped object, an information processing device, and a three-dimensional shaping device.

2. Related Art

Regarding a method for manufacturing a three-dimensional shaped object, for example, JP-T-2009-525207 discloses that a nozzle for extruding a shaping material is moved along a build path for constructing each layer of a three-dimensional shaped object. The build path includes a perimeter path, a bulk raster path, and a remnant path. The perimeter path is a path for forming a boundary between the three-dimensional shaped object and an outside, and the bulk raster path is a path for filling a region surrounded by the perimeter path. The remnant path is a path for filling a void region that is not filled with the perimeter path and the bulk raster path. In JP-T-2009-525207, in the remnant path, by changing an extrusion amount of the shaping material according to a width of the void region, occurrence of a gap in the void region is prevented.

In the technique described in JP-T-2009-525207, when an end point of the bulk raster path and a start point of the remnant path are at positions separated from each other, when the nozzle moves from the end point of the bulk raster path to the start point of the remnant path, there is a possibility that the shaping material hangs down from the nozzle in a stringy form and adheres to the three-dimensional shaped object, and shaping accuracy is reduced.

SUMMARY

A first aspect of the present disclosure provides a method for manufacturing a three-dimensional shaped object in which a three-dimensional shaped object is manufactured by discharging a shaping material from a discharge unit toward a stage to stack layers. The method for manufacturing a three-dimensional shaped object includes: a first step of specifying a gap portion sandwiched between a first partial path and a second partial path to which the shaping material is discharged from the discharge unit after the first partial path, based on first data including path data representing a path in which the discharge unit moves while discharging the shaping material by a plurality of partial paths, and including discharge control data including at least one of discharge amount information representing a discharge amount of the shaping material in each partial path and movement speed information representing a movement speed of the discharge unit in each partial path; a second step of, when the gap portion is specified, generating second data from the first data by changing the discharge control data corresponding to the first partial path such that a width of the shaping material deposited on the stage in the first partial path increases; and a third step of shaping the three-dimensional shaped object by controlling the discharge unit according to the second data.

A second aspect of the present disclosure provides an information processing device configured to generate data for stacking layers by discharging a shaping material from a discharge unit toward a stage. The information processing device includes a data generating unit configured to specify a gap portion sandwiched between a first partial path and a second partial path to which the shaping material is discharged from the discharge unit after the first partial path, based on first data including path data representing a path in which the discharge unit moves while discharging the shaping material by a plurality of partial paths, and including discharge control data including at least one of discharge amount information representing a discharge amount of the shaping material in each partial path and movement speed information representing a movement speed of the discharge unit in each partial path, and generate, when the gap portion is specified, second data from the first data by changing the discharge control data corresponding to the first partial path such that a width of the shaping material deposited on the stage in the first partial path increases.

A third aspect of the present disclosure provides a three-dimensional shaping device. The three-dimensional shaping device includes: a stage; a discharge unit configured to discharge a shaping material toward the stage; a moving mechanism configured to move the discharge unit with respect to the stage; a data generating unit configured to generate second data from first data; and a control unit configured to control the discharge unit and the moving mechanism according to the second data to shape a three-dimensional shaped object on the stage. The data generating unit is configured to specify a gap portion sandwiched between a first partial path and a second partial path to which the shaping material is discharged from the discharge unit after the first partial path, based on the first data including path data representing a path in which the discharge unit moves while discharging the shaping material by a plurality of partial paths, and including discharge control data including at least one of discharge amount information representing a discharge amount of the shaping material in each partial path and movement speed information representing a movement speed of the discharge unit in each partial path, and generate, when the gap portion is specified, the second data from the first data by changing the discharge control data corresponding to the first partial path such that a width of the shaping material deposited on the stage in the first partial path increases.

DESCRIPTION OF EXEMPLARY EMBODIMENTS

A. First Embodiment

Figure 1:
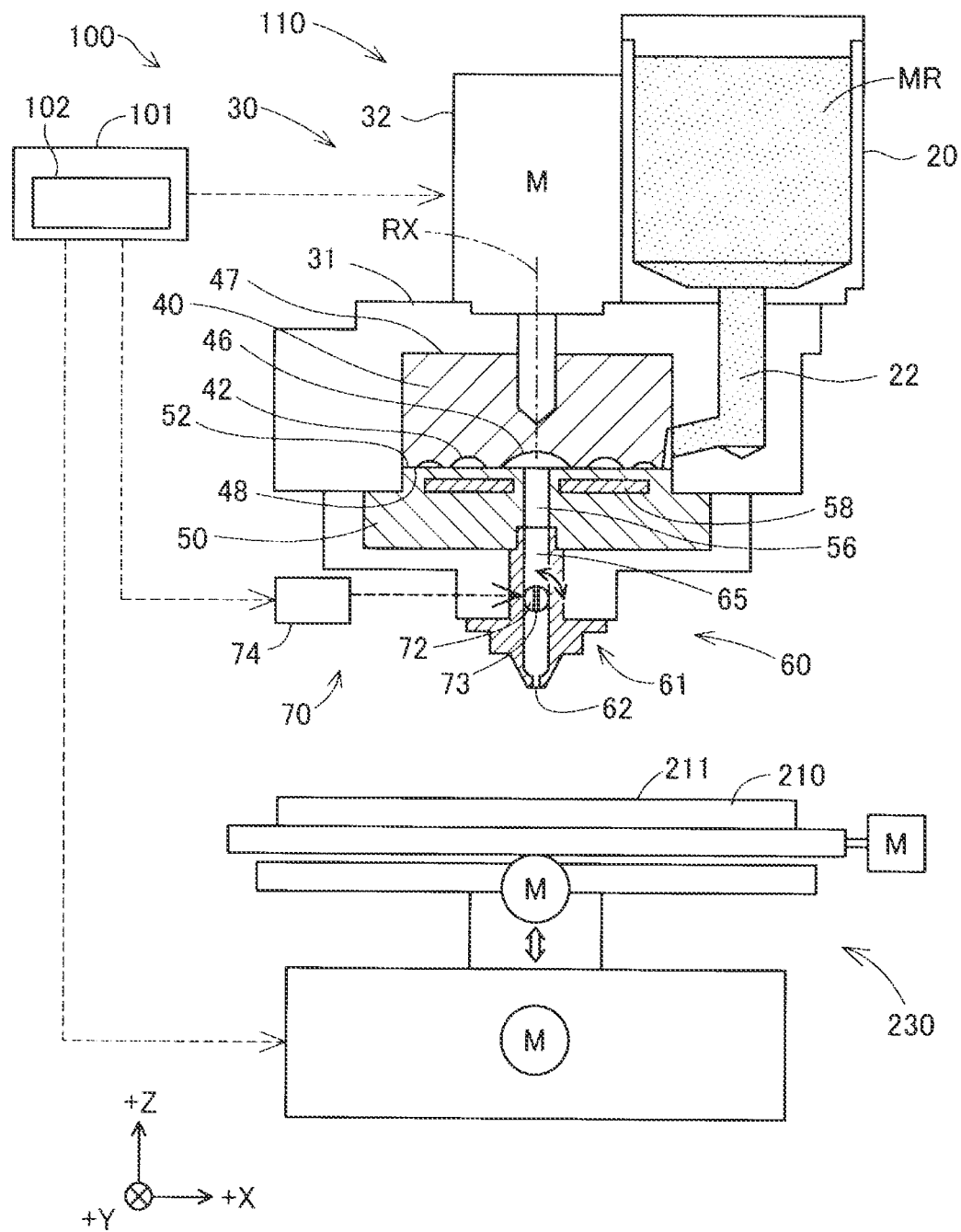
FIG. 1 is an illustrative diagram showing a schematic configuration of a three-dimensional shaping device.

FIG. 1 is an illustrative diagram showing a schematic configuration of a three-dimensional shaping device 100 according to a first embodiment. FIG. 1 shows arrows indicating X, Y, and Z directions orthogonal to each other. The X direction and the Y direction are directions parallel to a horizontal plane, and the Z direction is a direction opposite to a gravity direction. The arrows indicating the X, Y, and Z directions are also appropriately shown in other figures such that the shown directions correspond to those in FIG. 1. In the following description, when an orientation is specified, "+" indicates a positive direction, "−" indicates a negative direction, and positive and negative symbols are used together to indicate directions.

The three-dimensional shaping device 100 includes a control unit 101 that controls the three-dimensional shaping device 100, a shaping unit 110 that generates and discharges a shaping material, a shaping stage 210 as a base of a three-dimensional shaped object, and a moving mechanism 230 that controls a discharge position of the shaping material.

Under the control of the control unit 101, the shaping unit 110 discharges the shaping material in a form of a paste by melting a material in a solid state onto the stage 210. The shaping unit 110 includes a material supply unit 20 as a supply source of the material before being converted into the shaping material, a shaping material generating unit 30 that converts the material into the shaping material, and a discharge unit 60 that discharges the shaping material.

The material supply unit 20 supplies a raw material MR for generating the shaping material to the shaping material generating unit 30. The material supply unit 20 is configured with, for example, a hopper in which the raw material MR is housed. The material supply unit 20 has a discharge port on a lower side. The discharge port is coupled to the shaping material generating unit 30 via a communication path 22. The raw material MR is put into the material supply unit 20 in a form of pellets, powders, and the like. In the present embodiment, a pellet-shaped ABS resin material is used.

The shaping material generating unit 30 melts the raw material MR supplied from the material supply unit 20 to generate the paste-shaped shaping material exhibiting fluidity, and guides the shaping material to the discharge unit 60. The shaping material generating unit 30 includes a screw case 31, a drive motor 32, a flat screw 40, and a screw facing portion 50. The flat screw 40 is also referred to as a rotor or a scroll, and the screw facing portion 50 is also referred to as a barrel.

Figure 2:
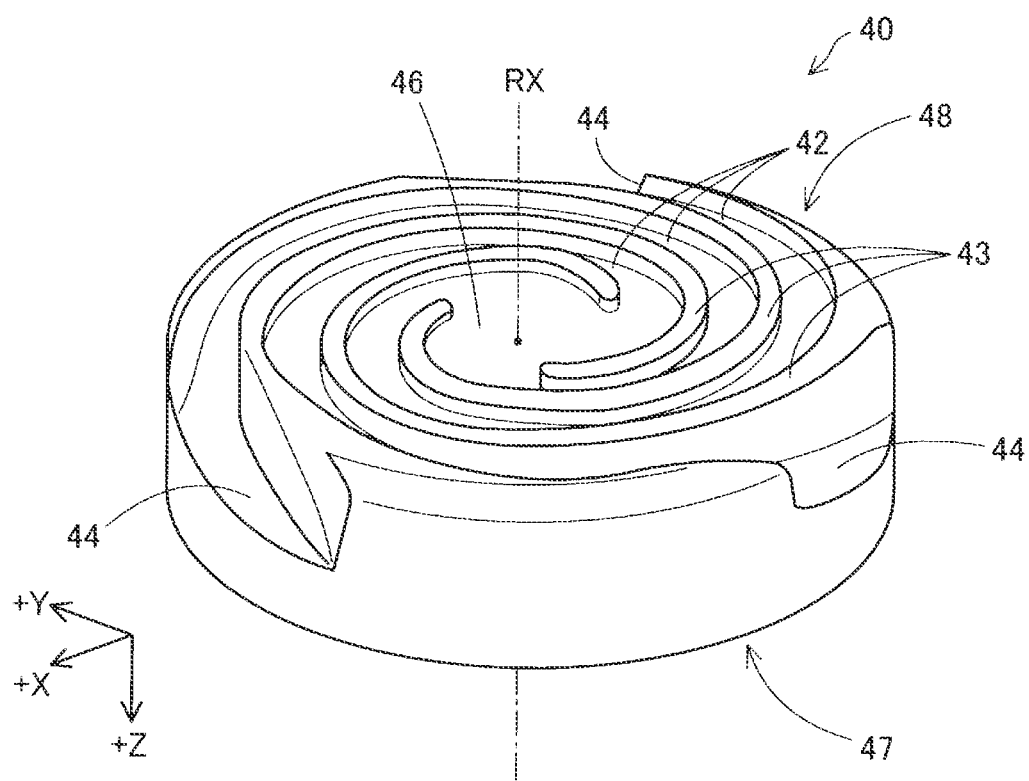
FIG. 2 is a perspective view showing a schematic configuration of a flat screw.
Figure 3:
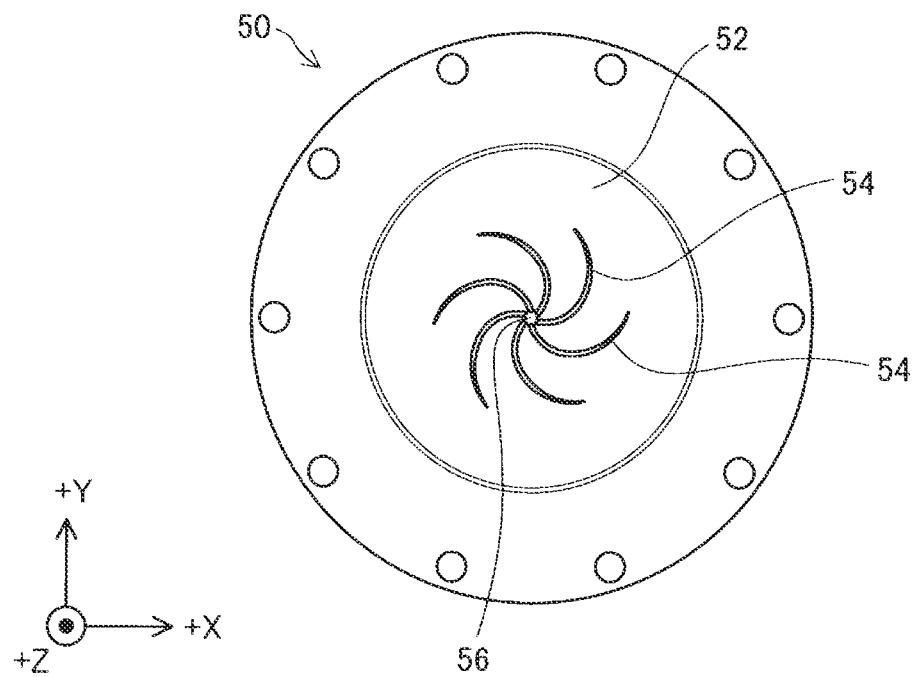
FIG. 3 is a schematic plan view of a screw facing portion.

FIG. 2 is a perspective view showing a schematic configuration of a lower surface 48 side of the flat screw 40. In order to facilitate understanding of the technique, the flat screw 40 shown in FIG. 2 is shown in a state where a positional relationship between an upper surface 47 and a lower surface 48 shown in FIG. 1 is reversed in a vertical direction. FIG. 3 is a schematic plan view showing an upper surface 52 side of the screw facing portion 50. The flat screw 40 has a substantially cylindrical shape in which a height in an axial direction, which is a direction along a central axis thereof, is smaller than a diameter thereof. The flat screw 40 is disposed such that a rotation axis RX serving as a rotation center thereof is parallel to the Z direction.

The flat screw 40 is accommodated in the screw case 31. An upper surface 47 side of the flat screw 40 is coupled to the drive motor 32, and the flat screw 40 is rotated in the screw case 31 by a rotational drive force generated by the drive motor 32. The drive motor 32 is driven under the control of the control unit 101.

Spiral groove portions 42 are formed in the lower surface 48 of the flat screw 40 which is a surface intersecting with the rotation axis RX. The communication path 22 of the material supply unit 20 described above communicates with the groove portions 42 from a side surface of the flat screw 40. As shown in FIG. 2, in the present embodiment, three groove portions 42 are formed so as to be separated from each other by ridge portions 43. The number of the groove portions 42 is not limited to three, and may be one or two or more. A shape of the groove portions 42 is not limited to the spiral shape, and may be a helical shape or an involute curve shape, or may be a shape extending in an arc from a central portion toward an outer periphery.

The lower surface 48 of the flat screw 40 faces the upper surface 52 of the screw facing portion 50, and a space is formed between the groove portions 42 of the lower surface 48 of the flat screw 40 and the upper surface 52 of the screw facing portion 50. In the shaping unit 110, the raw material MR is supplied from the material supply unit 20 to material inlets 44 shown in FIG. 2 in the space between the flat screw 40 and the screw facing portion 50.

A heater 58 for heating the raw material MR supplied into the groove portions 42 of the rotating flat screw 40 is embedded in the screw facing portion 50. A plurality of guide grooves 54 coupled to a communication hole 56 and extending in a spiral shape from the communication hole 56 toward the outer periphery are formed in the screw facing portion 50. The guide grooves 54 may be omitted. The raw material MR supplied into the groove portions 42 of the flat screw 40 flows along the groove portions 42 by the rotation of the flat screw 40 while being melted in the groove portions 42, and is guided to a central portion 46 of the flat screw 40 as the shaping material. The paste-shaped shaping material that flows into the central portion 46 and exhibits the fluidity is supplied to the discharge unit 60 via the communication hole 56 provided at a center of the screw facing portion 50 shown in FIG. 3. In the shaping material, all types of substances constituting the shaping material may not be melted. The shaping material may be converted into a state having the fluidity as a whole by melting at least a part of types of the substances of the substances constituting the shaping material.

The discharge unit 60 includes a nozzle 61 that discharges the shaping material, a flow path 65 for the shaping material provided between the flat screw 40 and the nozzle 61, and an opening and closing mechanism 70 that opens and closes the flow path 65. The nozzle 61 is coupled to the communication hole 56 of the screw facing portion 50 through the flow path 65. The nozzle 61 discharges the shaping material generated by the shaping material generating unit 30 from a discharge port 62 at a tip toward the stage 210.

The opening and closing mechanism 70 opens and closes the flow path 65 to control outflow of the shaping material from the nozzle 61. In the first embodiment, the opening and closing mechanism 70 is configured with a butterfly valve. The opening and closing mechanism 70 includes a drive shaft 72 that is a shaft-shaped member extending in one direction, a valve body 73 that is rotated by rotation of the drive shaft 72, and a valve drive unit 74 that generates a rotational drive force of the drive shaft 72.

The drive shaft 72 is attached in a middle of the flow path 65 so as to intersect a flow direction of the shaping material. More specifically, the drive shaft 72 is attached so as to be parallel to the Y direction which is a direction perpendicular to the flow direction of the shaping material in the flow path 65. The drive shaft 72 is rotatable around a central axis along the Y direction.

The valve body 73 is a plate-shaped member that rotates in the flow path 65. In the first embodiment, the valve body 73 is formed by processing a portion of the drive shaft 72 disposed in the flow path 65 into a plate shape. A shape of the valve body 73 when viewed in a direction perpendicular to a plate surface thereof substantially coincides with an opening shape of the flow path 65 at a portion where the valve body 73 is disposed.

The valve drive unit 74 rotates the drive shaft 72 under the control of the control unit 101. The valve drive unit 74 is configured with, for example, a stepping motor. The valve body 73 is rotated in the flow path 65 by the rotation of the drive shaft 72.

A state where the plate surface of the valve body 73 is perpendicular to the flow direction of the shaping material in the flow path 65 is a state where the flow path 65 is closed. In this state, inflow of the shaping material from the flow path 65 to the nozzle 61 is blocked, and outflow of the shaping material from the discharge port 62 is stopped. When the plate surface of the valve body 73 is rotated, by the rotation of the drive shaft 72, from the state where the plate surface is perpendicular to the flow direction, the inflow of the shaping material from the flow path 65 to the nozzle 61 is allowed, and the shaping material of a discharge amount corresponding to a rotation angle of the valve body 73 flows out from the discharge port 62. As shown in FIG. 1, a state where the plate surface of the valve body 73 is along the flow direction of the shaping material in the flow path 65 is a state where the flow path 65 is fully opened. In this state, the discharge amount of the shaping material per unit time from the discharge port 62 is maximized. In this way, the opening and closing mechanism 70 can implement ON/OFF of the outflow of the shaping material and adjustment of the discharge amount of the shaping material.

The stage 210 is disposed at a position facing the discharge port 62 of the nozzle 61. In the first embodiment, a shaping surface 211 of the stage 210 facing the discharge port 62 of the nozzle 61 is disposed so as to be parallel to the X and Y directions, that is, horizontal directions. As will be described later, in shaping processing, the three-dimensional shaping device 100 shapes the three-dimensional shaped object by discharging the shaping material from the discharge unit 60 toward the shaping surface 211 of the stage 210 to stack layers.

The moving mechanism 230 changes a relative position between the stage 210 and the nozzle 61. In the first embodiment, a position of the nozzle 61 is fixed, and the moving mechanism 230 moves the stage 210. The moving mechanism 230 is configured with a three-axis positioner that moves the stage 210 in three-axis directions including the X, Y, and Z directions by drive forces of three motors M. The moving mechanism 230 changes a relative positional relationship between the nozzle 61 and the stage 210 under the control of the control unit 101. In the present specification, unless otherwise specified, the movement of the nozzle 61 means that the nozzle 61 is moved with respect to the stage 210.

In another embodiment, instead of the configuration in which the stage 210 is moved by the moving mechanism 230, a configuration in which the moving mechanism 230 moves the nozzle 61 with respect to the stage 210 in a state where the position of the stage 210 is fixed may be adopted. Further, a configuration in which the stage 210 is moved in the Z direction by the moving mechanism 230 and the nozzle 61 is moved in the X and Y directions, or a configuration in which the stage 210 is moved in the X and Y directions by the moving mechanism 230 and the nozzle 61 is moved in the Z direction may be adopted. With these configurations, the relative positional relationship between the nozzle 61 and the stage 210 can be changed.

The control unit 101 is a control device that controls an overall operation of the three-dimensional shaping device 100. The control unit 101 is configured with a computer including one or a plurality of processors, a main storage device, and an input and output interface for inputting and outputting signals to and from an outside. The control unit 101 exerts various functions in addition to a function of a data generating unit 102 by the processor executing a program or a command read into the main storage device. Instead of being configured with the computer, the control unit 101 may be implemented by a configuration of combining a plurality of circuits in order to implement at least a part of the functions. The control unit 101 is also referred to as an information processing device.

The data generating unit 102 generates shaping data having a plurality of partial paths for moving the discharge unit 60 by the moving mechanism 230. The control unit 101 controls the shaping unit 110 including the opening and closing mechanism 70 and the discharge unit 60, and the moving mechanism 230 according to the shaping data generated by the data generating unit 102 to shape the three-dimensional shaped object on the stage 210.

The data generating unit 102 generates the shaping data by using shape data such as three-dimensional CAD data representing a shape of the three-dimensional shaped object. The shaping data includes discharge control data including a discharging path of the shaping material and the discharge amount of the shaping material by the discharge unit 60. The discharging path of the shaping material refers to a path along which the nozzle 61 moves relatively along the shaping surface 211 of the stage 210 while discharging the shaping material.

The discharging path includes the plurality of partial paths. Each partial path is a linear path. The discharge control data is individually associated with each partial path. In the present embodiment, the discharge amount represented by the discharge control data is an amount of the shaping material discharged per unit time in the partial path.

In another embodiment, a total amount of the shaping material discharged in all the partial paths may be associated with each partial path as the discharge control data.

Figure 4:
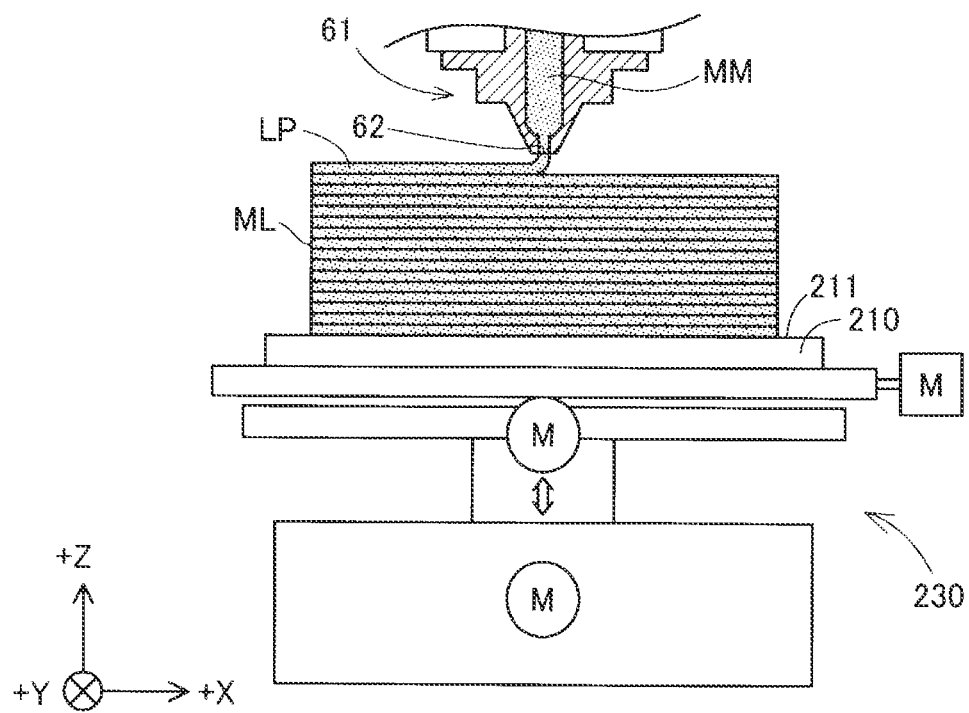
FIG. 4 is a schematic diagram schematically showing a state where a three-dimensional shaped object is shaped.

FIG. 4 is a schematic diagram schematically showing a state where the three-dimensional shaped object is shaped in the three-dimensional shaping device 100. In the three-dimensional shaping device 100, as described above, in the shaping material generating unit 30, the solid raw material MR supplied to the groove portions 42 of the rotating flat screw 40 is melted to generate a shaping material MM. The control unit 101 causes the nozzle 61 to discharge the shaping material MM while changing the position of the nozzle 61 with respect to the stage 210 in a direction along the shaping surface 211 of the stage 210 while maintaining a distance between the shaping surface 211 of the stage 210 and the nozzle 61. The shaping material MM discharged from the nozzle 61 is continuously deposited in a moving direction of the nozzle 61. By traversal by the nozzle 61, a linear portion LP that is a shaping portion linearly extending along a traversal path of the nozzle 61 is shaped.

The control unit 101 forms layers ML by repeating the scanning by the nozzle 61. The control unit 101 moves the position of the nozzle 61 with respect to the stage 210 in the Z direction after one layer ML is formed. Then, the three-dimensional shaped object is shaped by further stacking layers ML on the layers ML formed so far.

For example, the control unit 101 may temporarily interrupt the discharge of the shaping material from the nozzle 61 when the nozzle 61 moves in the Z direction in a case of completing one layer ML or when there are a plurality of independent shaping regions in each layer. In this case, the flow path 65 is closed by the valve body 73 of the opening and closing mechanism 70, and the discharge of the shaping material MM from the discharge port 62 is stopped. After changing the position of the nozzle 61, the control unit 101 opens the flow path 65 by the valve body 73 of the opening and closing mechanism 70 to restart the deposition of the shaping material MM from the changed position of the nozzle 61. According to the three-dimensional shaping device 100, a deposition position of the shaping material MM by the nozzle 61 can be easily controlled by the opening and closing mechanism 70.

Figure 5:
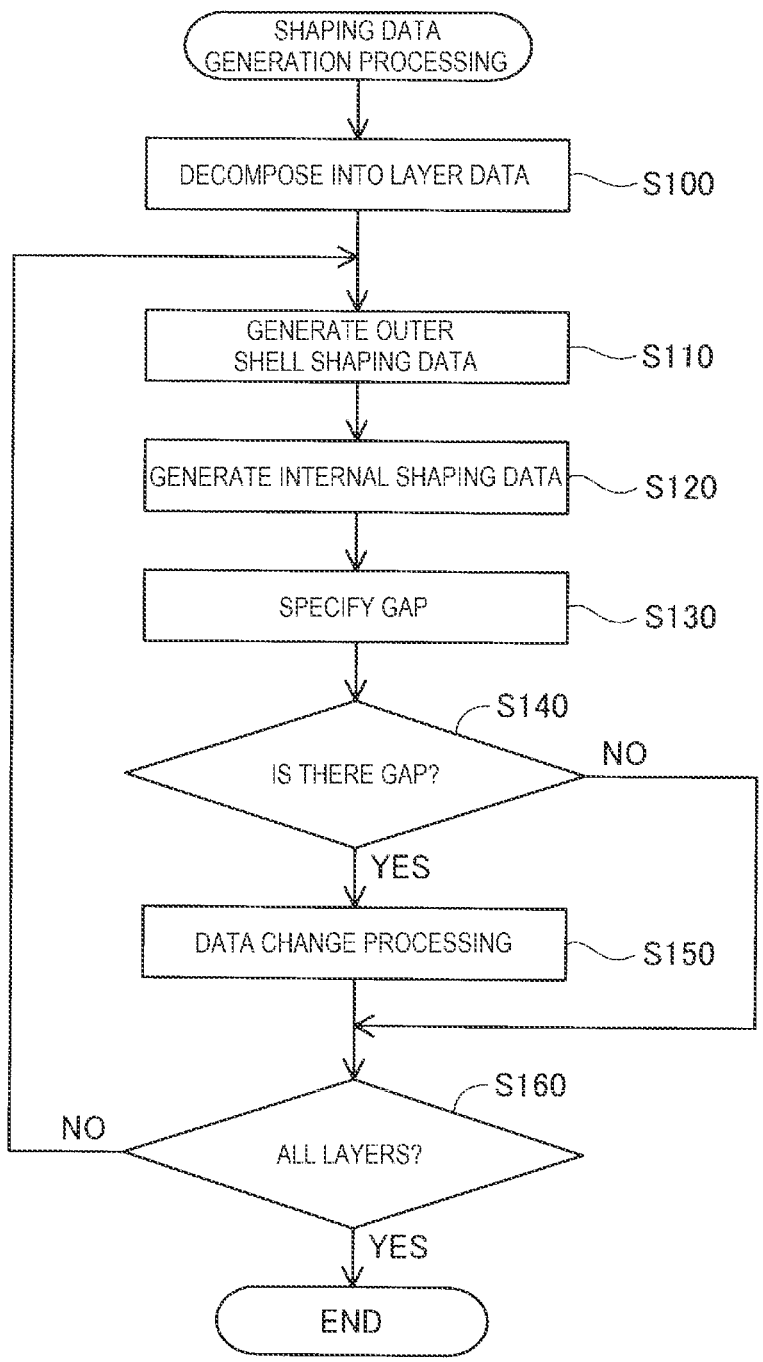
FIG. 5 is a diagram showing a flowchart of shaping data generation processing.
Figure 6:
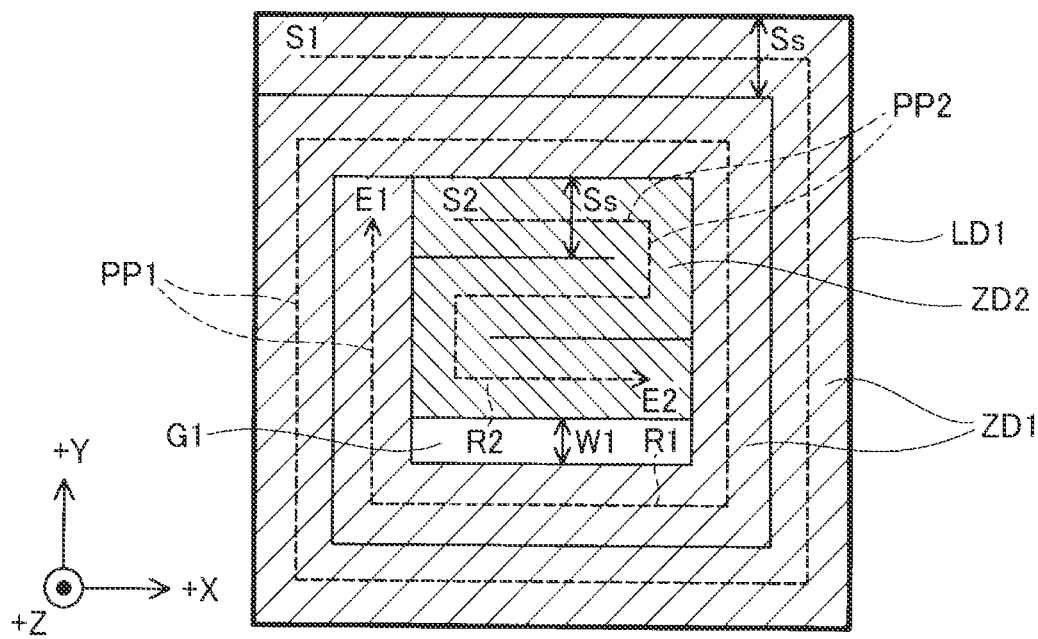
FIG. 6 is a diagram showing an example of a planar shape of a layer.
Figure 8:
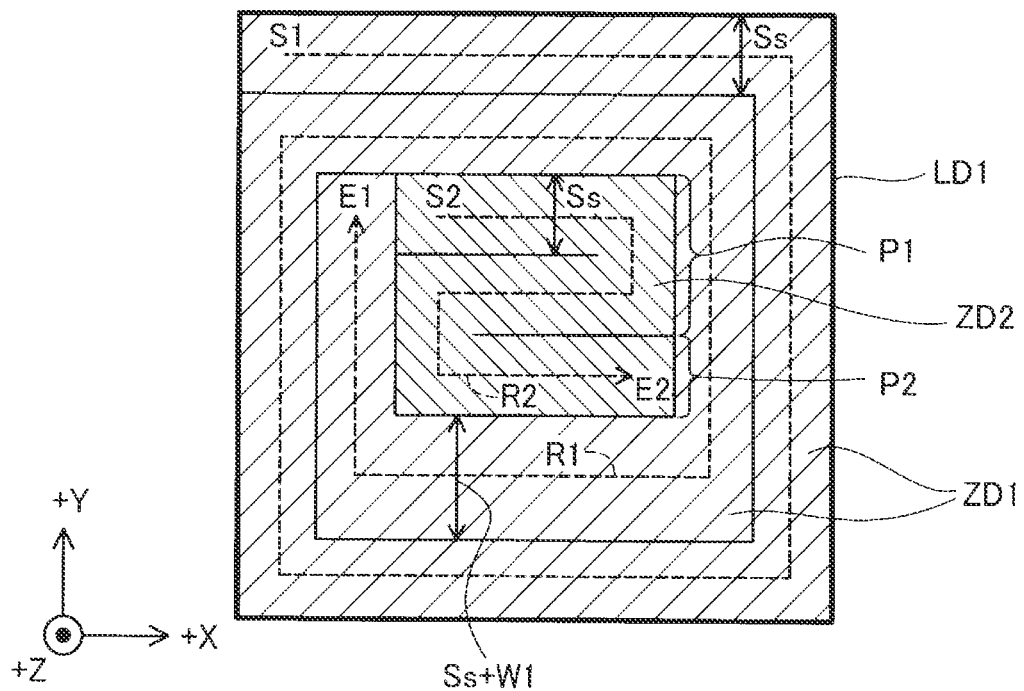
FIG. 8 is a diagram showing an example of a planar shape of the layer.

FIG. 5 is a flowchart of shaping data generation processing executed by the control unit 101. This processing is processing for generating the shaping data to be used for shaping the three-dimensional shaped object prior to the shaping of the three-dimensional shaped object. FIGS. 6 and 8 show examples of a planar shape of one layer of the three-dimensional shaped object.

As shown in FIG. 5, in step S100, the data generating unit 102 analyzes the three-dimensional CAD data that is the shaping data of the three-dimensional shaped object input from the outside, and generates layer data obtained by slicing the three-dimensional shaped object into a plurality of layers along an XY plane. The layer data is data representing an outer shell of the three-dimensional shaped object in the XY plane. FIG. 6 shows, by a thick line, the example in which a rectangular outer shell is represented by layer data LD1.

In step S110, the data generating unit 102 generates outer shell shaping data (an example of a first shaping data). The outer shell shaping data is data for forming an outer shell region in contact with an inner side of the outer shell represented by the layer data. The outer shell region is a region affecting an appearance of the three-dimensional shaped object. The outer shell shaping data includes a path for shaping an outermost periphery along the outer shell of the three-dimensional shaped object. The outer shell shaping data may include not only a discharging path for shaping the outermost periphery of the three-dimensional shaped object but also a discharging path including one inner periphery of the outermost periphery. The number of laps of the discharging paths for forming the outer shell region may be freely set.

FIG. 6 shows the example in which outer shell shaping data ZD1 is configured with an outermost discharging path and a discharging path for one inner periphery thereof. Each of these discharging paths includes a plurality of partial paths PP1 for shaping the outer shell region. As described above, each partial path PP1 is a linear path. Therefore, FIG. 6 shows the outer shell shaping data ZD1 by eight continuous partial paths PP1 indicated by a broken line from a start point indicated by "S1" to a position indicated by "E1" of the inner discharging path. Each of the partial paths PP1 is associated with a discharge amount of the shaping material deposited on the stage 210 in an amount corresponding to a predetermined reference width Ss as the discharge control data. In FIG. 6, the outermost discharging path and the inner discharging path are continuous, whereas these discharging paths may be configured as separate paths. That is, an end point of the outermost discharging path and a start point of the inner discharging path may be different positions.

In step S120, the data generating unit 102 generates internal shaping data (an example of a second shaping data). The internal shaping data is data for shaping an internal region, which is a region other than the outer shell region, inside the outer shell represented by the layer data. The internal region is a region that has a greater influence on a strength of the three-dimensional shaped object than the appearance of the three-dimensional shaped object.

FIG. 6 shows the example in which internal shaping data ZD2 is represented by a discharging path meandering in an S shape. The data generating unit 102 generates, as the internal shaping data ZD2, the discharging path for filling the internal region by gradually moving the discharge unit 60 in a direction orthogonal to a predetermined reference direction while reciprocating the discharge unit 60 along the reference direction in the XY plane. The discharging path for filling the internal region includes a plurality of partial paths PP2. As described above, each partial path PP2 is a linear path. Therefore, FIG. 6 shows the internal shaping data ZD2 by five partial paths PP2 from a start point indicated by "S2" to an end point indicated by "E2". Each of the partial paths PP2 is associated with the discharge amount of the shaping material deposited on the stage 210 in the amount corresponding to the predetermined reference width Ss as the discharge control data. In the present embodiment, both a width of the path formed in the outer shell shaping data ZD1 and a width of the path formed in the internal shaping data ZD2 are the reference width Ss, whereas they may have different widths.

FIG. 6 shows that the end point "E1" of the discharging path represented by the outer shell shaping data ZD1 and the start point "S2" of the discharging path represented by the internal shaping data ZD2 are at different positions. However, this is for convenience of illustration, and these positions are actually the same. Therefore, the discharging path represented by the outer shell shaping data ZD1 and the discharging path represented by the internal shaping data ZD2 are continuously coupled. However, in another embodiment, these discharging paths may be discontinuous paths. That is, the end point "E1" of the discharging path represented by the outer shell shaping data ZD1 and the start point "S2" of the discharging path represented by the internal shaping data ZD2 may be different positions.

Hereinafter, the outer shell shaping data generated in step S110 and the internal shaping data generated in step S120 are collectively referred to as "first data". The first data includes path data representing the path in which the discharge unit 60 moves while discharging the shaping material by the plurality of partial paths, and the discharge control data including discharge amount information representing the discharge amount of the shaping material in each partial path.

In step S130, the data generating unit 102 analyzes an arrangement and a width of each partial path to specify, based on the first data, a gap portion sandwiched between a first partial path and a second partial path to which the shaping material is discharged from the discharge unit 60 after the first partial path. In the present embodiment, the first partial path is a part of the path for shaping the outer shell region, and the second partial path is a part of the path for shaping the internal region.

In specifying the gap portion, the data generating unit 102 specifies the gap portion sandwiched between the first partial path and the second partial path and satisfying the following relationship (1).

$$W \leq S_{max} - S_s \quad (1)$$

W is a width of the gap portion, Ss is the reference width of the shaping material deposited in each partial path, and Smax is a maximum width of the shaping material that can be deposited in each partial path by the control of the opening and closing mechanism 70. The reference width Ss is a line width smaller than the maximum width Smax. The reference width Ss may be freely set, and may be, for example, 60% to 80% of the maximum width Smax. The reference width Ss may be larger than half of the maximum width Smax.

According to the relationship (1), the gap portion that can be filled by enlarging the width of the partial path of the reference width Ss adjacent to one side of the gap portion in a range up to the maximum width Smax is specified. FIG. 6 shows the example in which a gap portion G1 having a width W1 satisfying the above relationship is specified along partial paths between a first partial path R1 included in the outer shell shaping data ZD1 and a second partial path R2 included in the internal shaping data ZD2.

In step S140, the data generating unit 102 determines whether the gap portion satisfying the relationship (1) is specified. When the gap portion is specified, the data generating unit 102 executes data change processing for filling the gap portion in step S150. When the gap portion is not specified, the data generating unit 102 skips the data change processing. When the data change processing is executed, the first data described above is changed to generate second data. On the other hand, when the data change processing is not executed, the first data described above becomes the second data as it is. The second data is shaping data finally generated by the shaping data generation processing.

Figure 7:
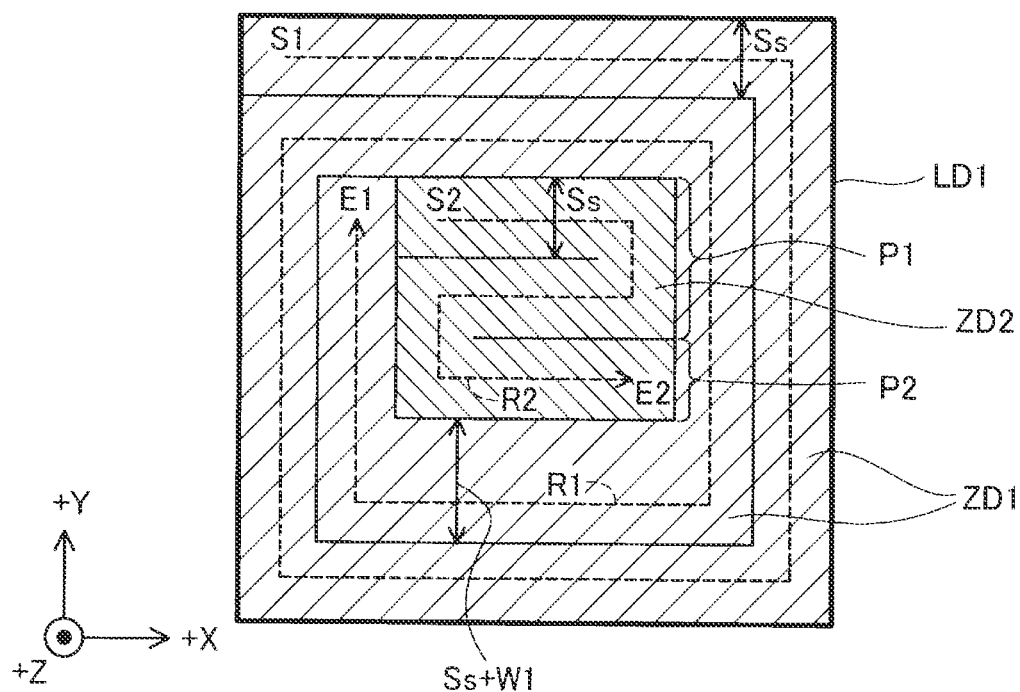
FIG. 7 is a diagram showing an example of a planar shape of the layer.

When the gap portion satisfies the relationship (1), the gap portion can be filled by increasing the width of only one of the first partial path and the second partial path. Therefore, in the present embodiment, in the data change processing in step S150, the data generating unit 102 generates the second data from the first data by changing the discharge control data corresponding to the first partial path such that the width of the shaping material deposited on the stage 210, that is, on the stage 210 or on the layer formed before, increases in the first partial path to which the shaping material is discharged first of the first partial path and the second partial path sandwiching the gap portion. In the present embodiment, the data generating unit 102 increases the width of the shaping material deposited in the first partial path by increasing the discharge amount represented by the discharge control data associated with the first partial path. In the example shown in FIG. 6, of the first partial path R1 and the second partial path R2 sandwiching the gap portion G1, the data generating unit 102 increases the discharge amount such that the width of the shaping material of the first partial path R1 to which the shaping material is discharged first is increased from the reference width Ss to a width obtained by adding the width W1 of the gap portion to the reference width Ss as shown in FIG. 7.

In the present embodiment, the data generating unit 102 increases the width of the shaping material of the first partial path, and changes the path of the first partial path according to a shape of the gap portion. Specifically, the data generating unit 102 changes a position of the path of the first partial path R1 such that the path of the linear first partial path R1 passes through a center of the shaping material after the line width is changed. The position of the path indicated by the broken line of the first partial path R1 shown in FIG. 8 is changed in the +Y direction with respect to the path indicated by the broken line of the first partial path R1 shown in FIG. 7. In this way, by changing not only the width of the first partial path but also the path itself, the gap portion can be filled with high accuracy.

FIG. 6 shows the example in which the shape of the gap portion G1 is a rectangular shape having a constant width, and the shape of the gap portion is not limited to the rectangular shape. For example, as shown in an upper part of FIG. 9, a width of a gap portion G11 may change like a fan shape. In this way, when the gap portion in which the width changes is specified, the data generating unit 102 changes the width of the shaping material deposited in the first partial path according to the change in the width of the gap portion. Specifically, as shown in a lower part of FIG. 9, the first partial path R1 adjacent to the gap portion is divided into a plurality of partial paths, and the line width of each of the divided partial paths is increased to the gap portion according to the change in the width. In this way, by changing the partial path, the gap portion can be efficiently filled and the shaping accuracy can be improved. Further, in the present embodiment, as shown in the lower part of FIG. 9, the data generating unit 102 changes the path of each divided partial path to a path corresponding to the shape of the gap portion. In the lower part of FIG. 9, each of the divided partial paths is changed from the linear path indicated by the broken line to a path along an arc shape of the gap portion. The change in the path of the partial path is implemented by, for example, changing the path to a path passing through a center of the enlarged width. In this way, by changing the first partial path to a path having a shape corresponding to the shape of the gap portion, the gap portion can be efficiently filled and the shaping accuracy can be improved.

In the present embodiment, in step S150, the data generating unit 102 generates the second data such that the discharging path represented by the outer shell shaping data ZD1 for shaping the outer shell region and the discharging path represented by the internal shaping data ZD2 for shaping the internal region are continuous. That is, when the end point of the discharging path represented by the outer shell shaping data ZD1 and the start point of the discharging path represented by the internal shaping data ZD2 do not coincide with each other, the second data is generated such that the end point and the start point coincide with each other.

In step S160, the data generating unit 102 determines whether the above processing is completed on all the layer data. When the processing is not completed on all the layer data, the data generating unit 102 repeats the processing from step S110 to step S150 on next layer data. When the generation of the shaping data is completed for all the layer data, the data generating unit 102 ends the shaping data generation processing. Step S130 in the shaping data generation processing described above is also referred to as a first step in the method of manufacturing a three-dimensional shaped object, and step S150 is also referred to as a second step in the same method.

Figure 10:
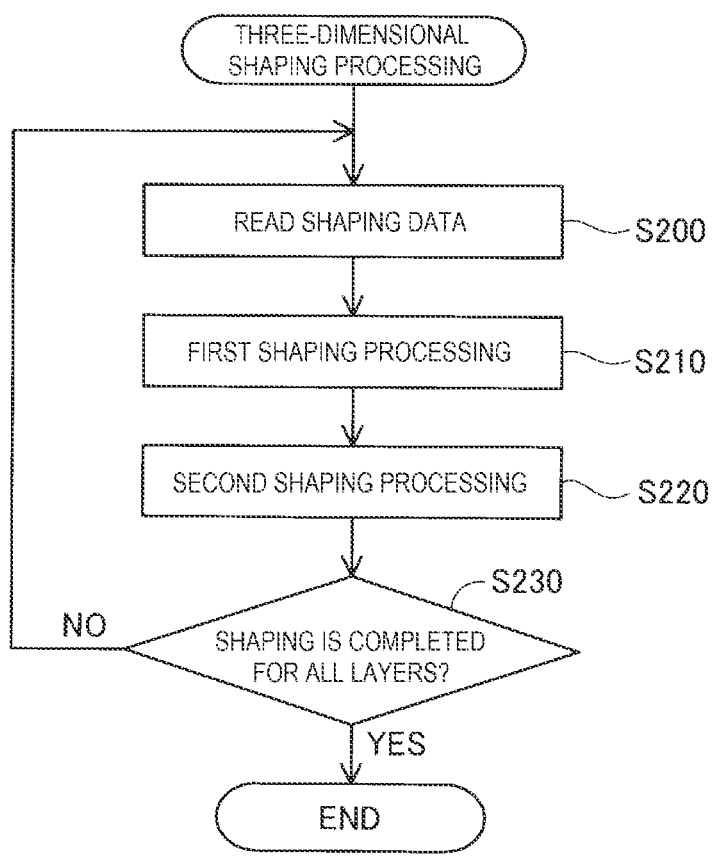
FIG. 10 is a flowchart of three-dimensional shaping processing.

FIG. 10 is a flowchart of the three-dimensional shaping processing executed by the control unit 101. The three-dimensional shaping processing shown in FIG. 10 is processing executed by the control unit 101 using the shaping data generated in the shaping data generation processing shown in FIG. 5. By executing the shaping data generation processing shown in FIG. 5 and the three-dimensional shaping processing shown in FIG. 10, the method for manufacturing a three-dimensional shaped object by the three-dimensional shaping device 100 is implemented.

In step S200, the control unit 101 reads the shaping data for one layer among the plurality of layers constituting the three-dimensional shaped object. The shaping data includes the outer shell shaping data and the internal shaping data described above. In the present embodiment, first, the control unit 101 reads shaping data of a lowermost layer in a gravity direction among the plurality of layers constituting the three-dimensional shaped object.

In step S210, the control unit 101 executes first shaping processing. In the first shaping processing, the control unit 101 controls the moving mechanism 230 and the discharge unit 60 in accordance with the partial path included in the outer shell shaping data and the discharge control data associated with each partial path to form the outer shell region for a current layer. In the example of the shaping data shown in FIG. 8, in the first shaping processing, the width of the shaping material in a portion corresponding to the first partial path R1 is enlarged from the reference width Ss to the width obtained by adding the width W1 of the gap portion to the reference width Ss.

In step S220, the control unit 101 executes second shaping processing. In the second shaping processing, the control unit 101 controls the moving mechanism 230 and the discharge unit 60 in accordance with the partial path included in the internal shaping data and the discharge control data associated with each partial path to form the internal region for the current layer. In the present embodiment, the shaping data is generated such that the path for shaping the outer shell region and the path for shaping the internal region are continuous in the shaping data generation processing described above. Therefore, in step S220, the formation of the internal region is started continuously from the position to which the discharge unit 60 is finally moved in step S210.

In step S230, the control unit 101 determines whether the shaping is completed for all the layers. When the shaping is not completed for all the layers, the control unit 101 repeats the processing of step S200 to step S220 for a next layer, that is, a layer adjacent to an upper side of the current layer in the gravity direction. In step S210, prior to the discharge of the shaping material from the discharge unit 60, the control unit 101 controls the moving mechanism 230 to raise the position of the nozzle 61 by one layer from the stage 210. When the shaping is completed for all the layers, the control unit 101 ends the three-dimensional shaping processing. Step S210 and step S220 in the three-dimensional shaping processing described above are also referred to as a third step in the method for manufacturing a three-dimensional shaped object.

According to the three-dimensional shaping device 100 according to the first embodiment described above, even when there is the gap portion sandwiched between the first partial path for forming the outer shell region and the second partial path for forming the internal region, the shaping data is generated such that the width of the shaping material deposited in the first partial path increases. Therefore, at a time of shaping the three-dimensional shaped object, it is not necessary to move the discharge unit 60 from a position away from the gap portion to the gap portion in order to fill the gap portion. Therefore, it is possible to reduce a decrease in the shaping accuracy of the three-dimensional shaped object due to hanging of the shaping material from the discharge unit 60.

Further, in the present embodiment, since the gap portion is filled by increasing the width of the existing partial path in order to fill the gap portion, it is not necessary to newly add a partial path having a narrow width. Therefore, it is possible to fill the gap portion more easily than to fill the gap portion with a narrow line width.

Further, in the present embodiment, since the discharging path for shaping the outer shell region and the discharging path for shaping the internal region are continuous, the internal region and the outer shell region can be continuously shaped. Therefore, when the discharge unit 60 moves between these regions, the shaping material does not hang down from the discharge unit 60. Therefore, it is possible to reduce the decrease in the shaping accuracy of the three-dimensional shaped object.

Figure 9:
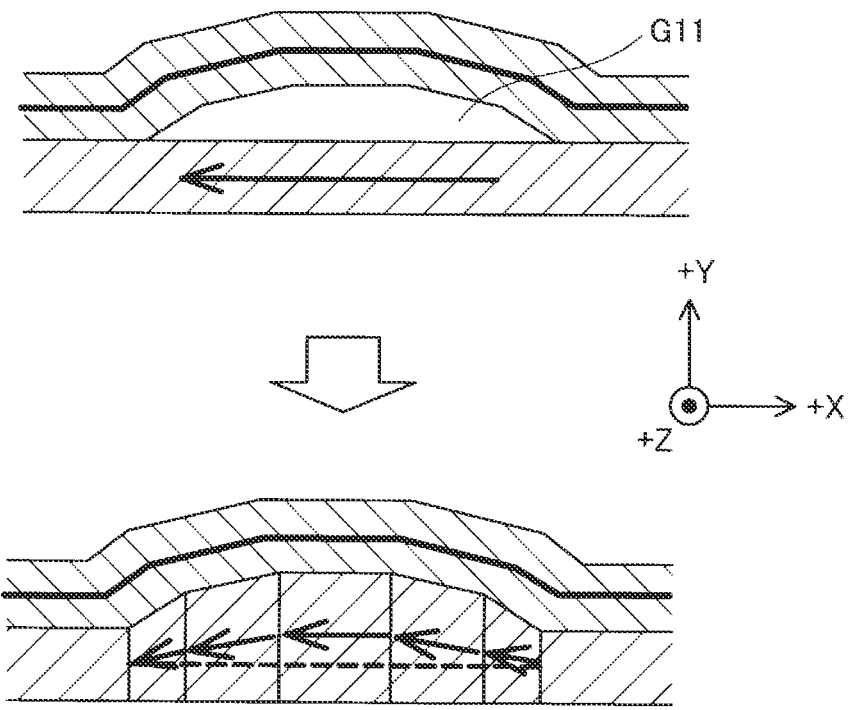
FIG. 9 is a diagram showing an example of changing paths.

In the present embodiment, in order to fill the gap portion, not only the width of the partial path but also the path is changed as shown in FIG. 8, whereas the change in the path may be omitted. In the present embodiment, the discharging path for shaping the outer shell region and the discharging path for shaping the internal region are continuous, whereas these may not be continuous. Further, in the present embodiment, as shown in FIG. 9, when the width of the gap portion changes, the width of the first partial path is changed according to the change in the width of the gap portion, whereas such processing may be omitted, and even when the width of the gap portion changes, the width of the first partial path may be enlarged by a certain width.

Figure 11:
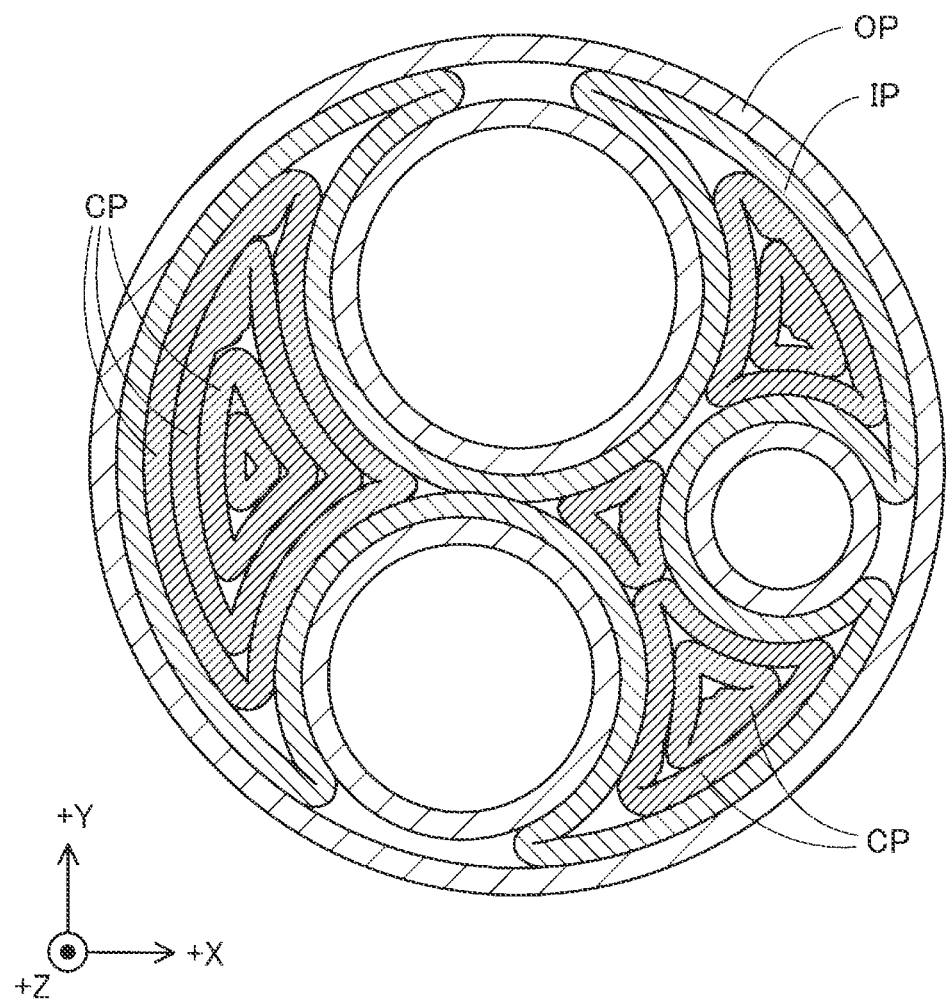
FIG. 11 is a diagram showing another example of the layer.
Figure 12:
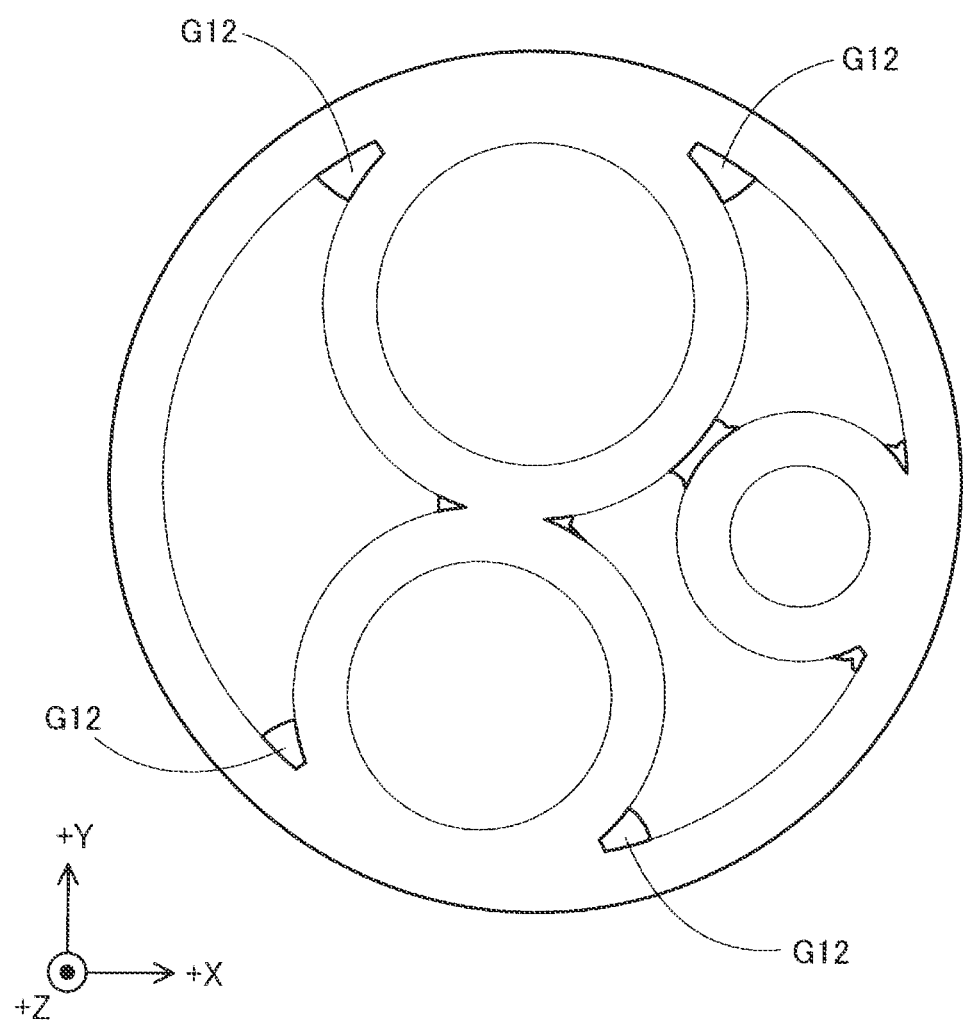
FIG. 12 is a diagram showing a state where gap portions are specified in the layer shown in FIG. 11.
Figure 13:
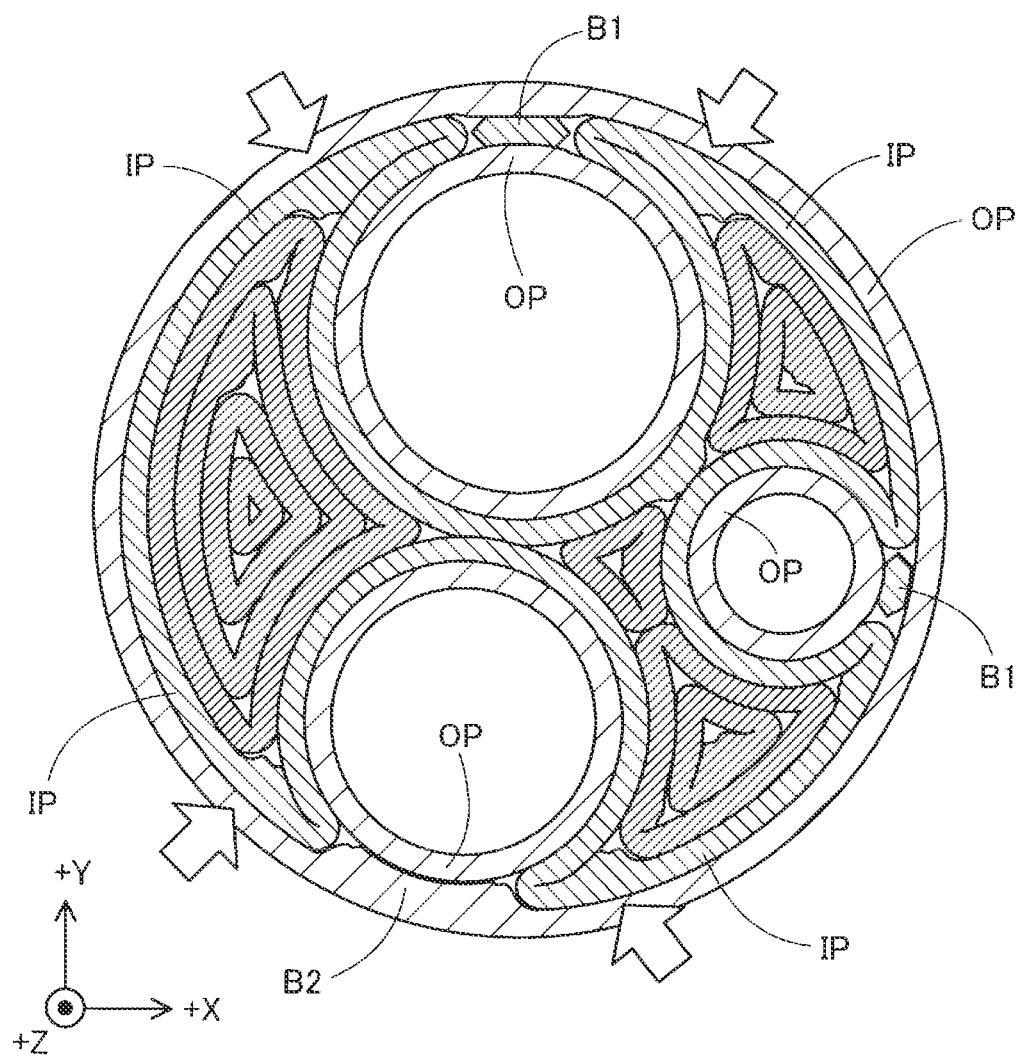
FIG. 13 is a diagram showing a state where the gap portions shown in FIG. 12 are filled.

FIGS. 11 to 13 illustrate other examples of a layer shaped in the present embodiment. In the layer shown in FIG. 11, three circles having different diameters are disposed in a circle, and the shaping material is filled between the outermost circle and the inner three circles. In the example shown in FIG. 11, the outer shell region includes outer periphery paths OP and an inner periphery path IP inside the outer periphery path OP. Then, the internal region is configured with multiple closed paths CP whose shape is reduced in stages. In FIG. 11, gaps in the internal region are filled by partially increasing widths of the closed paths CP in the internal region. Each of the outer periphery path OP, the inner periphery path IP, and the closed paths CP described above is formed by coupling the plurality of linear partial paths.

FIG. 12 shows a state where gap portions G12 between the outer shell region and the internal region are specified in the layer shown in FIG. 11. Further, FIG. 13 shows a state where the gap portions shown in FIG. 12 are filled by increasing the width of the partial path included in the inner periphery path IP in the outer shell region as indicated by arrows. That is, in the examples shown in FIGS. 11 to 13, the gap portions G12 formed between the internal region and the outer shell region are filled by enlarging the width of the partial path included in the inner periphery path IP of the outer shell region formed before the internal region.

Figure 14:
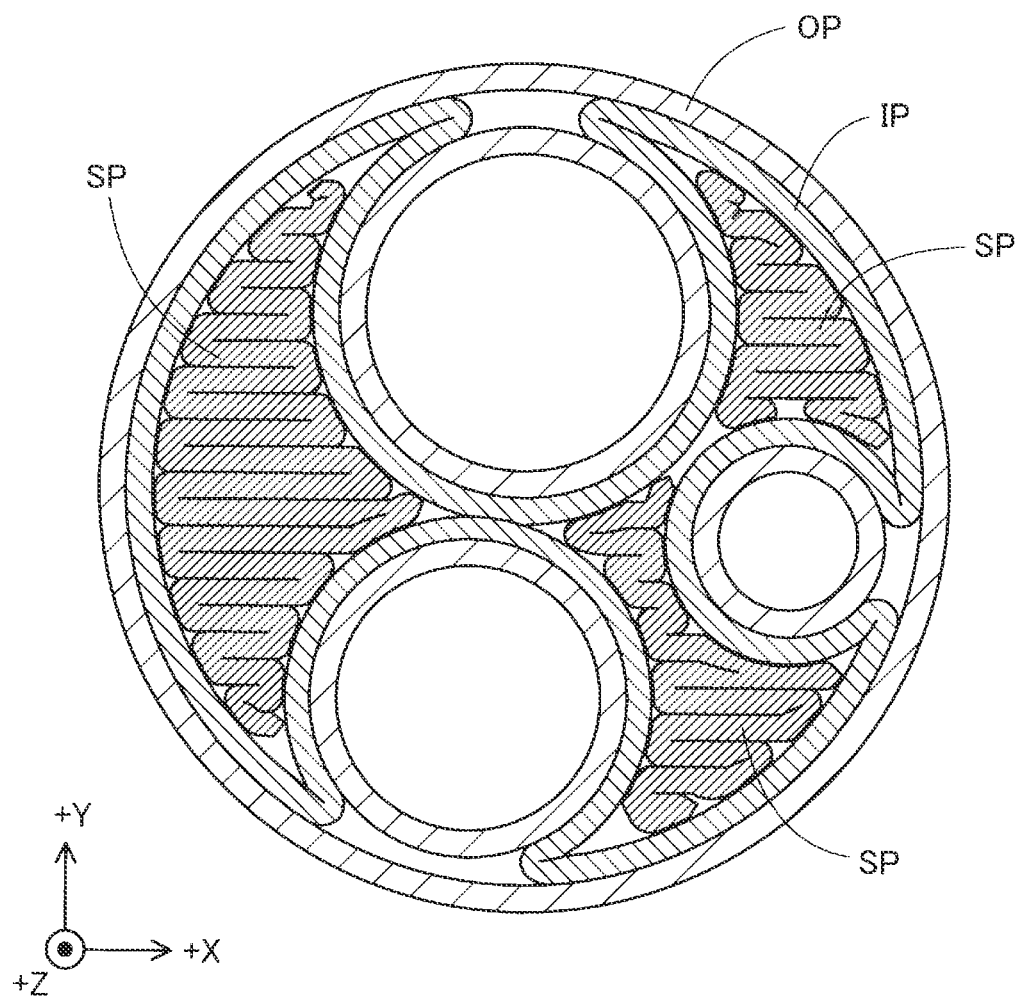
FIG. 14 is a diagram showing still another example of the layer.
Figure 15:
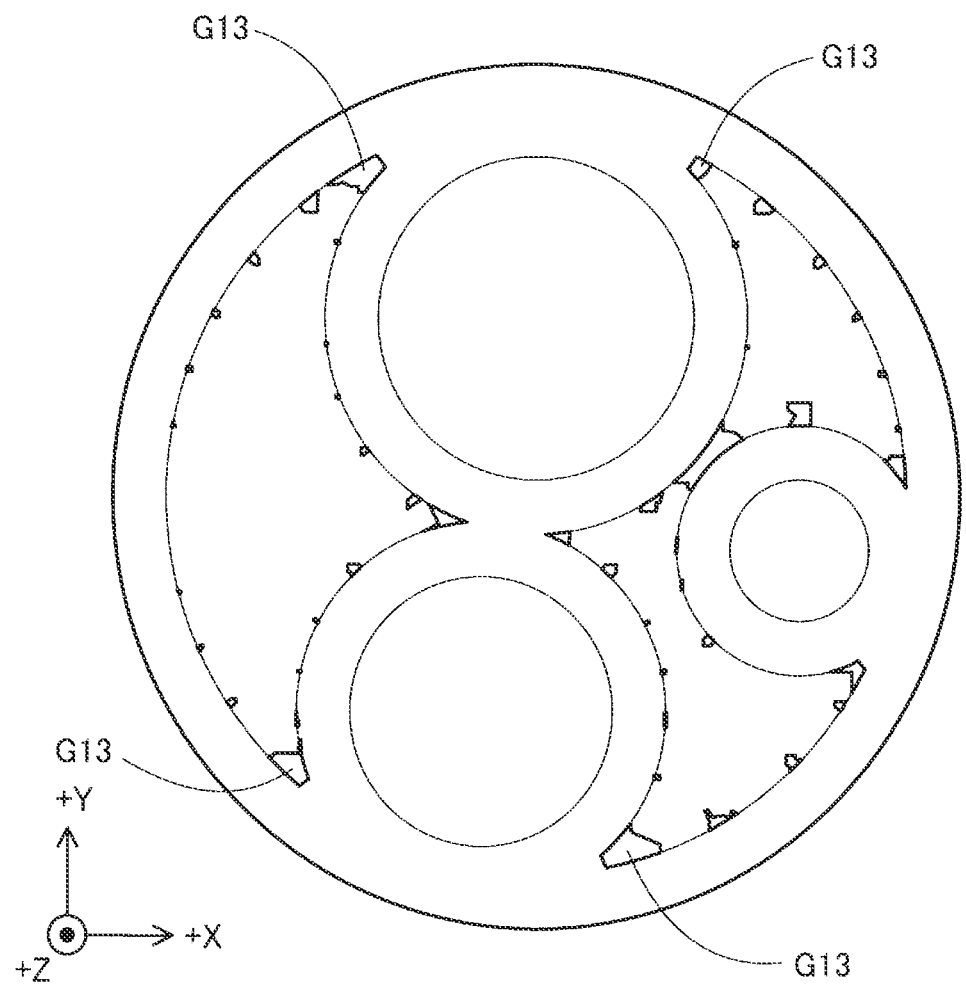
FIG. 15 is a diagram showing a state where gap portions are specified in the layer shown in FIG. 14.
Figure 16:
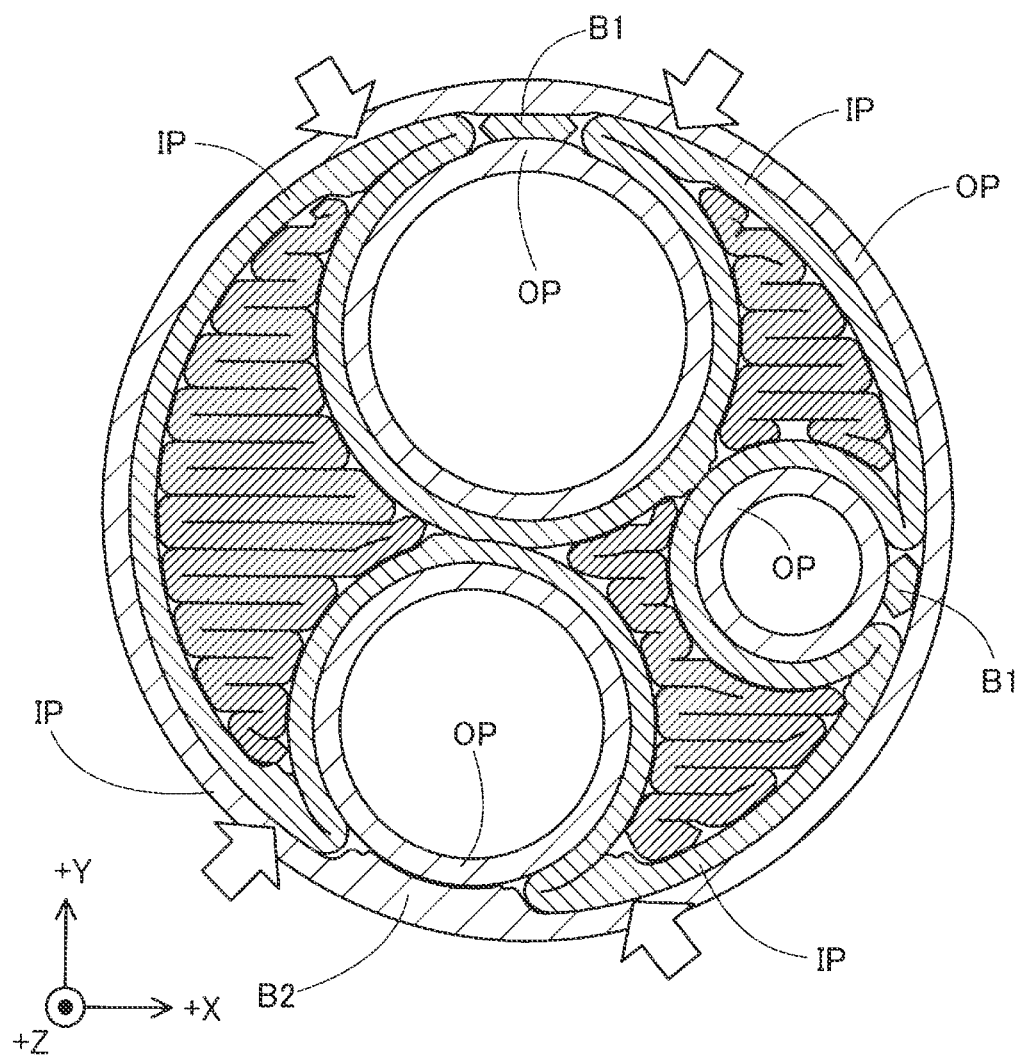
FIG. 16 is a diagram showing a state where the gap portions shown in FIG. 15 are filled.

FIGS. 14 to 16 illustrate still another example of the layer formed in the present embodiment. The layer shown in these figures is different from the layer shown in FIGS. to 13 in the configuration of the internal region.

Specifically, in the examples shown in FIGS. 11 to 13, the internal region is configured with the multiple closed paths CP whose shape is reduced in stages, whereas in the examples shown in FIGS. 14 to 16, the internal region is configured with paths SP meandering in the S shape, similarly to the path shown in FIG. 6. Similarly to FIG. 13, FIG. 15 shows a state where gap portions G13 between the outer shell region and the internal region are specified in the layer shown in FIG. 14, and FIG. 16 shows a state where the gap portions G13 shown in FIG. 15 are filled by increasing the width of the partial path included in the inner periphery path IP in the outer shell region.

Each of FIGS. 13 and 16 shows portions B1 in which new partial paths are set in the gap portion between the outer periphery paths OP and a portion B2 in which the width of the outermost outer periphery path OP is set to be large in order to fill the gap portion sandwiched between the outer periphery paths OP. In this way, the data generating unit 102 can add the new partial path in order to fill the gap portion between the outer periphery paths OP, or can increase the width of the partial path included in the outer periphery path OP instead of the inner periphery path IP in the outer shell region.

When there is the gap portion between the outer periphery paths OP, the partial path whose width is increased for filling the gap portion may be selectable. For example, when the appearance of the three-dimensional shaped object is prioritized, the width of the partial path included in the inner path is increased, and when the accuracy of the internal shape of the three-dimensional shaped object is prioritized, the width of the partial path included in the outer path is increased. Such selection can be implemented by, for example, preparing modes such as an appearance priority mode and an internal priority mode, and setting a mode to be used in the control unit 101 by a user.

B. Second Embodiment

Figure 17:
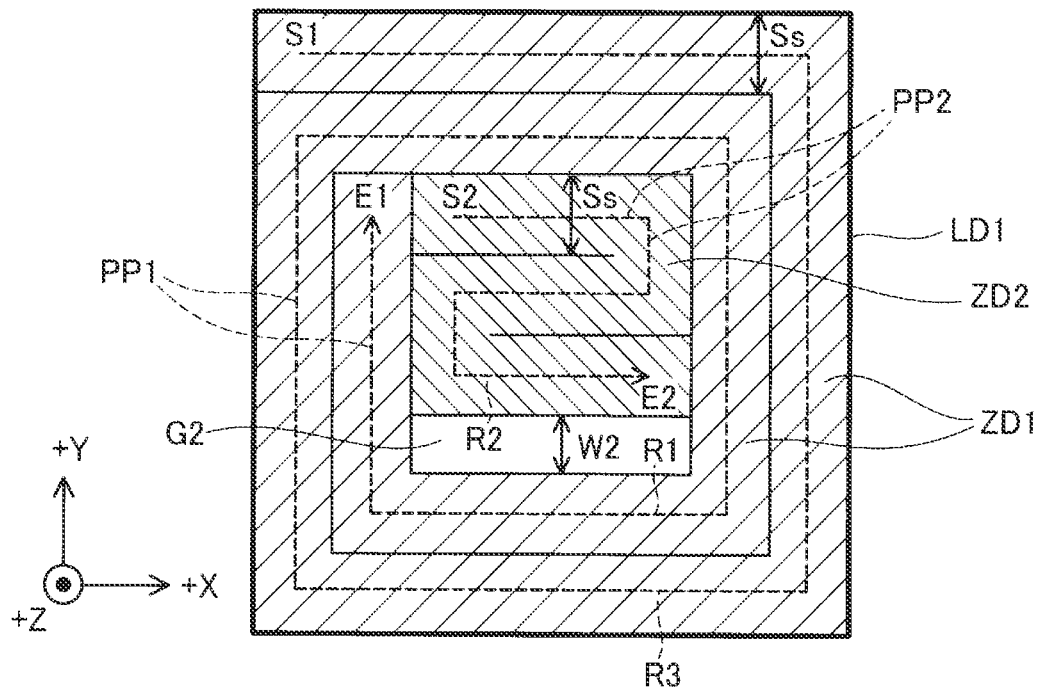
FIG. 17 is a diagram showing an example of a planar shape of a layer according to a second embodiment.
Figure 18:
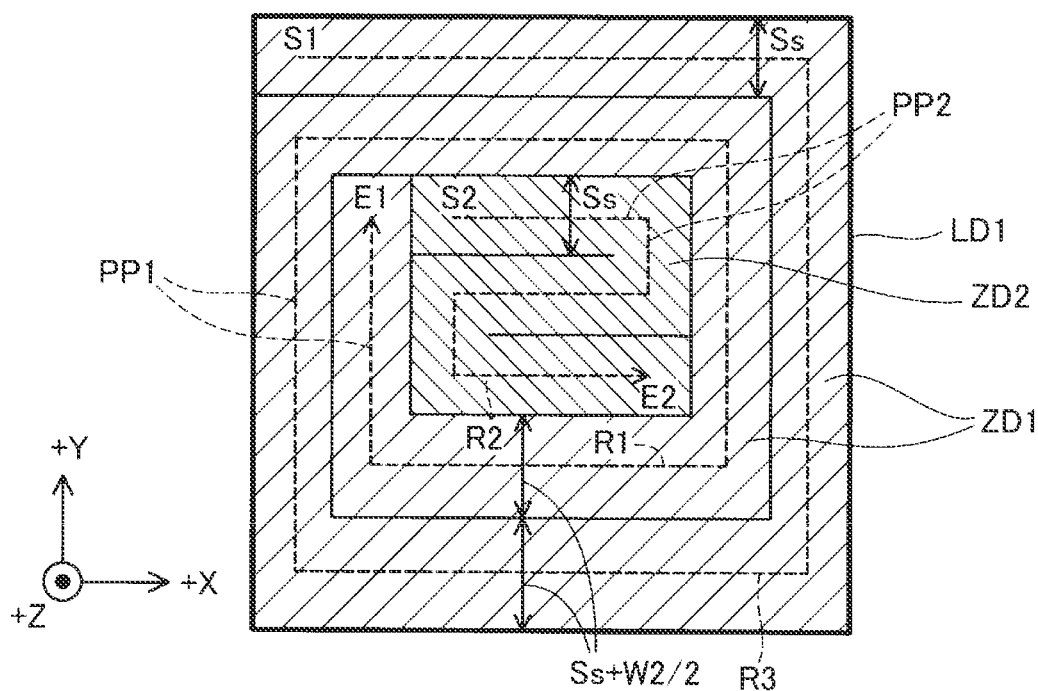
FIG. 18 is a diagram showing an example of a planar shape of the layer according to the second embodiment.

FIGS. 17 and 18 show examples of a planar shape of one layer of a three-dimensional shaped object according to a second embodiment. Similar to FIG. 6, FIG. 17 shows the example in which the outer shell shaping data ZD1 for shaping an outer shell region is configured with an outermost discharging path and a discharging path for one inner periphery thereof. Each of these discharging paths includes a plurality of partial paths PP1 for shaping the outer shell region. Each of the partial paths PP1 is associated with a discharge amount of a shaping material deposited on the stage 210 in an amount corresponding to a predetermined reference width Ss as discharge control data.

Similar to FIG. 6, FIG. 17 shows the example in which the internal shaping data ZD2 for shaping an internal region is represented by a discharging path meandering in an S shape. The discharging path for filling the internal region includes a plurality of partial paths PP2. Each of the partial paths PP2 is associated with the discharge amount of the shaping material deposited on the stage 210 in the amount corresponding to the predetermined reference width Ss as the discharge control data.

In the present embodiment, in step S130 shown in FIG. 5, the data generating unit 102 analyzes an arrangement and a width of each partial path to specify, based on first data including outer shell shaping data and internal shaping data, a gap portion sandwiched between a first partial path and a second partial path to which the shaping material is discharged from the discharge unit 60 after the first partial path. Similar to the first embodiment, the first partial path is a part of a path for shaping the outer shell region, and the second partial path is a part of a path for shaping the internal region. The data generating unit 102 specifies the gap portion sandwiched between the first partial path and the second partial path and satisfying the following relationship (2).

$$W > Smax - Ss \qquad (2)$$

W is a width of the gap portion, Ss is a reference width of the shaping material deposited in each partial path, and Smax is a maximum width of the shaping material that can be deposited in each partial path by control of the opening and closing mechanism 70.

According to the relationship (2), a gap portion that cannot be filled even when the width of the partial path of the reference width Ss adjacent to one side of the gap portion is enlarged to the maximum width Smax is specified. FIG. 17 shows the example in which a gap portion G2 having a width W2 satisfying the above relationship is specified along the partial paths between the first partial path R1 included in the outer shell shaping data ZD1 and the second partial path R2 included in the internal shaping data ZD2. The width W2 is larger than the width W1 shown in FIG. 6.

In the present embodiment, when the gap portion satisfying the above relationship (2) is specified, a gap portion in which a third partial path R3 to which the shaping material is discharged from the discharge unit 60 before the first partial path R1 and that is adjacent to the first partial path R1 is present is specified from the specified gap portion. That is, in the present embodiment, in step S130 of FIG. 5, the gap portion satisfying the relationship (2) and satisfying a condition that the third partial path R3 to which the shaping material is discharged from the discharge unit 60 before the first partial path R1 and that is adjacent to the first partial path R1 is present is specified. In the present embodiment, both the first partial path R1 and the third partial path R3 are a part of the path for shaping the outer shell region. In particular, in the present embodiment, the third partial path R3 is a part of a path for shaping an outermost periphery of the outer shell region, and the first partial path R1 is a part of a path located between the outermost periphery of the outer shell region and the internal region.

In the present embodiment, in data change processing in step S150 of FIG. 5, as shown in FIG. 18, second data is generated from first data by changing the discharge control data corresponding to the first partial path R1 and the third partial path R3 so as to increase the width of the shaping material deposited on the stage 210 in the first partial path R1 to which the shaping material is discharged before the second partial path R2 and the third partial path R3. In the example shown in FIG. 18, the data generating unit 102 increases the discharge amount represented by the discharge control data of each of the first partial path R1 and the third partial path R3 such that the width of each of the shaping materials of the first partial path R1 in which the shaping material is discharged first of the first partial path R1 and the second partial path R2 sandwiching the gap portion G2 and the third partial path R3 to which the shaping material is discharged before the first partial path R1 and that is adjacent to the first partial path R1 is increased from the reference width Ss to a width obtained by adding half of the width W2 of the gap portion to the reference width Ss. In this way, the gap portion G2 can be filled by increasing the width of each of the first partial path R1 and the third partial path R3.

As the widths of both the first partial path R1 and the third partial path R3 are increased, in step S150, changes in paths of the first partial path R1 and the third partial path R3 may be performed according to a shape of the gap portion G2. In the example shown in FIG. 18, positions of the paths of the first partial path R1 and the third partial path R3 indicated by a broken line are moved in a +Y direction from positions of the paths shown in FIG. 17. In this way, the gap portion can be filled with high accuracy. Further, when the shape of the gap portion is not rectangular as shown in an upper part of FIG. 9, both the first partial path R1 and the third partial path R3 may be divided into a plurality of partial paths, and the width of each of the divided partial paths may be increased according to the shape of the gap portion as shown in a lower part of FIG. 9.

According to the second embodiment described above, a large gap portion can be filled by increasing the width of each of the shaping materials deposited in the partial paths of both the first partial path shaped before the second partial path and the third partial path. That is, when the gap portion cannot be filled only by increasing the width of the first partial path, the gap portion can be filled by increasing the width of the third partial path on an outer peripheral side of the first partial path. Therefore, shaping accuracy of the three-dimensional shaped object can be improved.

Further, in the present embodiment, since both the first partial path and the third partial path whose widths are increased are a part of the path for shaping the outer shell region, the gap portion between the outer shell region and the internal region can be filled by increasing the width of the shaping material deposited in the path for shaping the outer shell region.

C. Other Embodiments (C-1) In the above-described embodiment, when a gap portion is specified between two partial paths, a change in a line width of an inner partial path to be shaped later may be prioritized over a change in a line width of an outer partial path shaped earlier. More specifically, when the gap portion is specified between an internal region and an outer shell region in step S130 shown in FIG. 5, the data generating unit 102 may first preferentially increase a width of a second partial path included in the internal region, and generate second data from first data by changing discharge control data corresponding to a first partial path such that a width of the first partial path included in the outer shell region increases only when the gap portion is not completely filled by increasing the width of the second partial path. In this way, it is possible to reduce a change in the width of the partial path constituting the outer shell region, and thus it is possible to reduce a change in an appearance shape of a three-dimensional shaped object in order to fill the gap portion. Such processing can be applied not only to the gap portion between the internal region and the outer shell region but also to a case of filling a gap portion in the internal region or a gap portion in the outer shell region.

(C-2) In the above-described embodiment, in step S130 shown in FIG. 5, even when the gap portion is specified between the first partial path and the second partial path, when the first partial path is a part of a path for shaping an outermost periphery of the outer shell region, the data generating unit 102 may generate the second data from the first data without changing the discharge control data corresponding to the first partial path. That is, when the first partial path is a part of the path for shaping the outermost periphery of the outer shell region, the data generating unit 102 may not increase the width of the first partial path. In this way, it is possible to reduce the change in the appearance shape of the three-dimensional shaped object in order to fill the gap portion.

(C-3) In the above-described embodiment, the data generating unit 102 fills the gap portion between the outer shell region and the internal region. In contrast, the data generating unit 102 may fill the gap portion formed in the internal region. That is, the second data may be generated from the first data so as to fill the gap portion sandwiched between two partial paths by increasing the width of the shaping material in the partial path to which the shaping material is first discharged of the two partial paths for forming the internal region. Further, the data generating unit 102 may fill the gap portion formed in the outer shell region. That is, the second data may be generated from the first data so as to fill the gap portion sandwiched between two partial paths by increasing the width of the shaping material in the partial path to which the shaping material is first discharged of the two partial paths for forming the outer shell region.

(C-4) In the above-described embodiment, the outer shell region of the three-dimensional shaped object is shaped by the outer shell shaping data, and the internal region is shaped by the internal shaping data. In contrast, the shaping data may not be distinguished between the outer shell shaping data and the internal shaping data. The three-dimensional shaped object may be shaped by a single type of the shaping data.

(C-5) In the above-described embodiment, the discharge control data included in the shaping data includes information representing the discharge amount of the shaping material, and the width of the shaping material deposited on the stage 210 is increased by increasing the discharge amount. In contrast, the discharge control data may include movement speed information representing a movement speed of the discharge unit 60. In this case, in the data change processing shown in step S150 of FIG. 5, the width of the shaping material deposited on the stage 210 can be increased by decreasing a movement speed associated with the first partial path. In this case, an amount of the shaping material discharged per unit time may be constant in shaping each partial path. However, the width of the shaping material deposited on the stage 210 can be adjusted by adjusting both the discharge amount of the shaping material and the movement speed of the discharge unit 60.

(C-6) In the above-described embodiment, a material is plasticized by the flat screw 40 in the shaping unit 110. In contrast, the shaping unit 110 may plasticize the material by, for example, rotating an in-line screw. In addition, a head used in a thermal dissolution lamination method may be adopted as the shaping unit 110.

(C-7) In the above-described embodiment, the opening and closing mechanism 70 may be configured with a mechanism using a plunger in which a piston protrudes into the flow path 65 to close the flow path 65, or a mechanism using a shutter that moves in the direction intersecting the flow path 65 to close the flow path 65. The opening and closing mechanism 70 may be configured by combining two or more of the butterfly valve of the above-described embodiment, the above-described shutter mechanism, and the above-described plunger mechanism. Further, the discharge amount of the shaping material may be controlled by controlling the number of rotations of the flat screw 40 instead of the opening and closing mechanism 70.

(C-8) In the above-described embodiment, the pellet-shaped ABS resin material is used as a raw material to be supplied to the material supply unit 20. In contrast, the three-dimensional shaping device 100 can shape the three-dimensional shaped object using various materials such as a thermoplastic material, a metal material, and a ceramic material as a main material. Here, the "main material" refers to a material serving as a center component for forming a shape of the three-dimensional shaped object, and refers to a material having a content of 50 mass % or more in the three-dimensional shaped object. The shaping materials described above include those in which the main materials are melted alone, and those in which a part of the components contained together with the main materials are melted to form a paste.

When the thermoplastic material is used as the main material, the shaping material generating unit 30 generates the shaping material by plasticizing this material. A term "plasticize" means that heat is applied to the thermoplastic material to melt the material.

Examples of the thermoplastic material may include the following thermoplastic resin materials.

Examples of Thermoplastic Resin Material

General-purpose engineering plastics such as a polypropylene resin (PP), a polyethylene resin (PE), a polyacetal resin (POM), a polyvinyl chloride resin (PVC), a polyamide resin (PA), an acrylonitrile-butadiene-styrene resin (ABS), a polylactic acid resin (PLA), a polyphenylene sulfide resin (PPS), polyether ether ketone (PEEK), polycarbonate (PC), modified polyphenylene ether, polybutylene terephthalate, and polyethylene terephthalate, and engineering plastics such as polysulfone, polyether sulfone, polyphenylene sulfide, polyarylate, polyimide, polyamideimide, polyetherimide, and polyether ether ketone An additive such as a wax, a flame retardant, an antioxidant, and a heat stabilizer may be mixed into the thermoplastic material, in addition to a pigment, a metal, and a ceramic. In the shaping material generating unit 30, the thermoplastic material is converted into a melted state by being plasticized by the rotation of the flat screw 40 and heating of the heater 58. After the shaping material generated by melting the thermoplastic material is discharged from the nozzle 61, the shaping material is cured due to a reduction in temperature.

It is desirable that the thermoplastic material is discharged from the nozzle 61 in a state of being melted completely by being heated to a temperature equal to or higher than a glass transition point thereof. For example, a glass transition point of the ABS resin is about 120° C., and it is desirable that the ABS resin is discharged from the nozzle 61 at about 200° C. In order to discharge the shaping material in such a high temperature state, a heater may be provided around the nozzle 61.

In the three-dimensional shaping device 100, for example, the following metal materials may be used as the main material instead of the thermoplastic materials described above. In this case, it is desirable that a component to be melted at the time of generating the shaping material is mixed into a powder material obtained by converting the following metal materials into a powder, and then the mixture is put into the shaping material generating unit 30 as a raw material.

Examples of Metal Material

A single metal of magnesium (Mg), iron (Fe), cobalt (Co) or chromium (Cr), aluminum (Al), titanium (Ti), copper (Cu), and nickel (Ni), or an alloy containing one or more of these metals Examples of Alloy Maraging steel, stainless steel, cobalt chrome molybdenum, titanium alloy, nickel alloy, aluminum alloy, cobalt alloy, and cobalt chromium alloy In the three-dimensional shaping device 100, the ceramic material may be used as the main material instead of the above-described metal material. Examples of the ceramic material may include an oxide ceramic such as silicon dioxide, titanium dioxide, aluminum oxide, and zirconium oxide, and a non-oxide ceramic such as aluminum nitride. When the metal material or the ceramic material described above is used as the main material, the shaping material disposed on the stage 210 may be cured by irradiating with a laser or sintering with hot air.

A powder material of the metal material or the ceramic material to be put into the material supply unit 20 as the raw material may be a mixed material obtained by mixing a plurality of types of powder of a single metal, powder of the alloy, and powder of the ceramic material. Further, the powder material of the metal material or the ceramic material may be coated with, for example, the thermoplastic resin shown in the above-described example, or a thermoplastic resin other than those in the above-described example. In this case, the thermoplastic resin may be melted in the shaping material generating unit 30 to exhibit fluidity.

For example, the following solvents may be added to the powder material of the metal material or the ceramic material to be put into the material supply unit 20 as the raw material. As the solvent, one kind or a combination of two or more kinds selected from the following may be used.

Examples of Solvent

Water, (poly)alkylene glycol monoalkyl ethers such as ethylene glycol monomethyl ether, ethylene glycol monoethyl ether, propylene glycol monomethyl ether, and propylene glycol monoethyl ether, acetate esters such as ethyl acetate, n-propyl acetate, isopropyl acetate, n-butyl acetate, and isobutyl acetate, aromatic hydrocarbons such as benzene, toluene, and xylene, ketones such as methyl ethyl ketone, acetone, methyl isobutyl ketone, ethyl-n-butyl ketone, diisopropyl ketone, and acetylacetone, alcohols such as ethanol, propanol, and butanol, tetraalkylammonium acetates, sulfoxide-based solvents such as dimethyl sulfoxide and diethyl sulfoxide, pyridine-based solvents such as pyridine, γ-picoline, and 2,6-lutidine, tetraalkylammonium acetates (such as tetrabutylammonium acetate), and ionic liquids such as butyl carbitol acetate In addition, for example, the following binders may be added to the powder material of the metal material or the ceramic material to be put into the material supply unit 20 as the raw material.

Examples of Binder

Acrylic resin, epoxy resin, silicone resin, cellulose-based resin or other synthetic resins or polylactic acid (PLA), polyamide (PA), polyphenylene sulfide (PPS), polyetheretherketone (PEEK) or other thermoplastic resins D. Other Aspects The present disclosure is not limited to the above-described embodiments, and can be implemented by various configurations without departing from the gist of the present disclosure. For example, in order to solve a part or all of problems described above, or to achieve a part or all of effects described above, technical characteristics in the embodiments corresponding to technical characteristics in aspects to be described below can be replaced or combined as appropriate. Further, the technical characteristics can be deleted as appropriate unless the technical characteristics are described as essential in the present specification.

(1) According to a first aspect of the present disclosure, a method for manufacturing a three-dimensional shaped object is provided in which a three-dimensional shaped object is manufactured by discharging a shaping material from a discharge unit toward a stage to stack layers. The method for manufacturing a three-dimensional shaped object includes: a first step of specifying a gap portion sandwiched between a first partial path and a second partial path to which the shaping material is discharged from the discharge unit after the first partial path, based on first data including path data representing a path in which the discharge unit moves while discharging the shaping material by a plurality of partial paths, and including discharge control data including at least one of discharge amount information representing a discharge amount of the shaping material in each partial path and movement speed information representing a movement speed of the discharge unit in each partial path; a second step of, when the gap portion is specified, generating second data from the first data by changing the discharge control data corresponding to the first partial path such that a width of the shaping material deposited on the stage in the first partial path increases; and a third step of shaping the three-dimensional shaped object by controlling the discharge unit according to the second data.

According to such an aspect, even when there is the gap portion sandwiched between the first partial path and the second partial path to which the shaping material is discharged after the first partial path, shaping data is generated such that the width of the shaping material deposited on the stage in the first partial path to which the shaping material is discharged first increases. Therefore, at a time of shaping the three-dimensional shaped object, it is not necessary to move the discharge unit from a position away from the gap portion to the gap portion in order to fill the gap portion. Therefore, it is possible to reduce a decrease in shaping accuracy of the three-dimensional shaped object due to hanging of the shaping material from the discharge unit.

(2) In the aspect described above, the first partial path is a part of a path for shaping an outer shell region along an outer shell of the three-dimensional shaped object, and the second partial path is a part of a path for shaping an internal region as a region other than the outer shell region of the three-dimensional shaped object.

According to such an aspect, the gap portion between the outer shell region along the outer shell of the three-dimensional shaped object and the internal region as the region other than the outer shell region can be filled by increasing the width of the shaping material deposited on the stage in the first partial path for shaping the outer shell region.

(3) In the aspect described above, in the second step, the second data may be generated such that the path for shaping the outer shell region and the path for shaping the internal region are continuous.

According to such an aspect, since the outer shell region and the internal region of the three-dimensional shaped object can be continuously shaped, it is possible to more effectively reduce a decrease in shaping accuracy of the three-dimensional shaped object due to hanging of the shaping material from the discharge unit.

(4) In the aspect described above, in the second step, the second data may be generated such that the width of the shaping material deposited on the stage in the first partial path changes according to a change in a width of the gap portion.

According to such an aspect, the gap portion can be filled with high accuracy.

(5) In the aspect described above, when W≤Smax−Ss, wherein Ss is a reference width of the shaping material deposited on the stage in each partial path, Smax is a maximum width of the shaping material that can be deposited on the stage in each partial path, and W is a width of the gap portion, in the second step, the second data may be generated from the first data by changing the discharge control data corresponding to the first partial path of the first partial path and the second partial path.

According to such an aspect, the gap portion can be efficiently filled by increasing the width of the shaping material deposited in the first partial path.

(6) In the aspect described above, when W>Smax−Ss, wherein Ss is a reference width of the shaping material deposited on the stage in each partial path, Smax is a maximum width of the shaping material that can be deposited on the stage in each partial path, and W is a width of the gap portion, and when there is a third partial path that is adjacent to the first partial path and to which the shaping material is discharged from the discharge unit before the first partial path, in the second step, the second data may be generated from the first data by changing the discharge control data corresponding to the first partial path and the third partial path such that the width of the shaping material deposited on the stage in the first partial path and the third partial path increases.

According to such an aspect, a large gap portion can be filled by increasing the width of the shaping material deposited in the partial paths of both the first partial path to be shaped before the second partial path and the third partial path.

(7) In the aspect described above, in the second step, the second data may be generated by changing paths of the first partial path and the third partial path included in the first data according to a shape of the gap portion.

According to such an aspect, the gap portion can be filled with high accuracy.

(8) In the aspect described above, the first partial path and the third partial path may be both a part of a path for shaping an outer shell region along an outer shell of the three-dimensional shaped object.

According to such an aspect, the gap portion between the outer shell region and the internal region can be filled by increasing the width of the shaping material deposited in the path for shaping the outer shell region.

(9) In the aspect described above, in the second step, when the gap portion is not filled even when a width of the shaping material deposited on the stage in the second partial path is preferentially increased, the second data may be generated from the first data by changing the discharge control data corresponding to the first partial path such that the width of the shaping material deposited on the stage in the first partial path increases.

According to such an aspect, since the width of the second partial path to be shaped later than the first partial path to be shaped earlier can be preferentially increased, for example, when the first partial path is a path for shaping the outer shell region and the second partial path is a path for shaping the internal region, it is possible to reduce a change in the appearance shape of the three-dimensional shaped object.

(10) In the aspect described above, in the second step, even when the gap portion is specified, when the first partial path is a path for shaping an outermost periphery of an outer shell region along an outer shell of the three-dimensional shaped object, the second data may be generated from the first data without changing the discharge control data corresponding to the first partial path.

According to such an aspect, it is possible to reduce the change in the appearance shape of the three-dimensional shaped object in order to fill the gap portion.

(11) According to a second aspect of the present disclosure, an information processing device configured to generate data for stacking layers by discharging a shaping material from a discharge unit toward a stage is provided. The information processing device includes a data generating unit configured to specify a gap portion sandwiched between a first partial path and a second partial path to which the shaping material is discharged from the discharge unit after the first partial path, based on first data including path data representing a path in which the discharge unit moves while discharging the shaping material by a plurality of partial paths, and including discharge control data including at least one of discharge amount information representing a discharge amount of the shaping material in each partial path and movement speed information representing a movement speed of the discharge unit in each partial path, and generate, when the gap portion is specified, second data from the first data by changing the discharge control data corresponding to the first partial path such that a width of the shaping material deposited on the stage in the first partial path increases.

(12) According to a third aspect of the present disclosure, a three-dimensional shaping device is provided. The three-dimensional shaping device includes: a stage; a discharge unit configured to discharge a shaping material toward the stage; a moving mechanism configured to move the discharge unit with respect to the stage; a data generating unit configured to generate second data from first data; and a control unit configured to control the discharge unit and the moving mechanism according to the second data to shape a three-dimensional shaped object on the stage. The data generating unit is configured to specify a gap portion sandwiched between a first partial path and a second partial path to which the shaping material is discharged from the discharge unit after the first partial path, based on first data including path data representing a path in which the discharge unit moves while discharging the shaping material by a plurality of partial paths, and including discharge control data including at least one of discharge amount information representing a discharge amount of the shaping material in each partial path and movement speed information representing a movement speed of the discharge unit in each partial path, and generate, when the gap portion is specified, second data from the first data by changing the discharge control data corresponding to the first partial path such that a width of the shaping material deposited on the stage in the first partial path increases.

What is claimed is:

1. A method for manufacturing a three-dimensional shaped object in which a three-dimensional shaped object is manufactured by discharging a shaping material from a nozzle of a discharge unit toward a stage to stack layers, the method for manufacturing a three-dimensional shaped object comprising:

generating a first shaping data representing a first discharge path along which the discharge unit moves while discharging the shaping material to form a first partial path, the first shaping data containing at least one of discharge amount information representing a discharge amount of the shaping material and movement speed information representing a movement speed of the discharge unit for forming the first partial path;

generating a second shaping data representing a second discharge path along which the discharge unit moves while discharging the shaping material to form a second partial path after the first partial path is formed, the second shaping data containing at least one of discharge amount information representing a discharge amount of the shaping material and movement speed information representing a movement speed of the discharge unit for forming the second partial path;

specifying a gap portion sandwiched between the first partial path and the second partial path based on the first shaping data and the second shaping data;

when the gap portion is specified, changing the first shaping data corresponding to the first partial path by dividing the first partial path adjacent to the gap portion into a plurality of partial paths, and increasing a width of each of the partial paths according to change in a width of the gap portion so that the shaping material deposited on the stage in the first partial path increases; and shaping the three-dimensional shaped object by controlling the discharge unit according to the first shaping data and the second shaping data.

2. The method for manufacturing a three-dimensional shaped object according to claim 1, wherein
the first partial path is a part of a path for shaping an outer shell region along an outer shell of the three-dimensional shaped object, and
the second partial path is a part of a path for shaping an internal region as a region other than the outer shell region of the three-dimensional shaped object.

3. The method for manufacturing a three-dimensional shaped object according to claim 2, wherein
the first shaping data is changed such that the path for shaping the outer shell region and the path for shaping the internal region are continuous.

4. The method for manufacturing a three-dimensional shaped object according to claim 1, wherein
the first shaping data is changed such that the width of the shaping material deposited on the stage in the first partial path changes according to a change in a width of the gap portion.

5. The method for manufacturing a three-dimensional shaped object according to claim 1, wherein
the first shaping data is changed when $W \leq Smax-Ss$, wherein $Ss$ is a reference width of the shaping material deposited on the stage in each partial path, $Smax$ is a maximum width of the shaping material that can be deposited on the stage in each partial path, and $W$ is a width of the gap portion.

6. The method for manufacturing a three-dimensional shaped object according to claim 1, wherein
the generating of the first shaping data includes generating the first shaping data representing the first discharge path and a third partial path that is adjacent to the first partial path and to which the shaping material is discharged from the discharge unit before the first partial path, when $W>Smax-Ss$, wherein $Ss$ is a reference width of the shaping material deposited on the stage in each partial path, Smax is a maximum width of the shaping material that can be deposited on the stage in each partial path, and W is a width of the gap portion, the first shaping data is changed such that the width of the shaping material deposited on the stage in the first partial path and the third partial path increases.

7. The method for manufacturing a three-dimensional shaped object according to claim 6, wherein
the first shaping data is changed by changing paths of the first partial path and the third partial path according to a shape of the gap portion.

8. The method for manufacturing a three-dimensional shaped object according to claim 6, wherein
the first partial path and the third partial path are both a part of a path for shaping an outer shell region along an outer shell of the three-dimensional shaped object.

9. The method for manufacturing a three-dimensional shaped object according to claim 1, wherein
when the gap portion is not filled even when a width of the shaping material deposited on the stage in the second partial path is preferentially increased, the first shaping data is changed such that the width of the shaping material deposited on the stage in the first partial path increases.

10. The method for manufacturing a three-dimensional shaped object according to claim 1, wherein
the first shaping data is not changed even when the gap portion is specified, when the first partial path is a path for shaping an outermost periphery of an outer shell region along an outer shell of the three-dimensional shaped object.

11. An information processing device configured to generate data for stacking layers by discharging a shaping material from a nozzle of a discharge unit toward a stage, the information processing device comprising:
a data generating unit configured to
generate a first shaping data representing a first discharge path along which the discharge unit moves while discharging the shaping material to form a first partial path, the first shaping data containing at least one of discharge amount information representing a discharge amount of the shaping material and movement speed information representing a movement speed of the discharge unit for forming the first partial path;
generate a second shaping data representing a second discharge path along which the discharge unit moves while discharging the shaping material to form a second partial path after the first partial path is formed, the second shaping data containing at least one of discharge amount information representing a discharge amount of the shaping material and movement speed information representing a movement speed of the discharge unit for forming the second partial path;
specify a gap portion sandwiched between the first partial path and the second partial path based on the first shaping data and the second shaping data; and
when the gap portion is specified, change the first shaping data corresponding to the first partial path by dividing the first partial path adjacent to the gap portion into a plurality of partial paths, and increasing a width of each of the partial paths according to change in a width of the gap portion so that the shaping material deposited on the stage in the first partial path increases.

12. A three-dimensional shaping device comprising:
a stage;
a discharge unit comprising a nozzle configured to discharge a shaping material toward the stage;
a moving mechanism configured to move the discharge unit with respect to the stage;
a data generating unit configured to generate a first shaping data and a second shaping data; and
a control unit configured to control the discharge unit and the moving mechanism according to the first shaping data and the second shaping data to shape a three-dimensional shaped object on the stage, wherein
the data generating unit is configured to
generate the first shaping data representing a first discharge path along which the discharge unit moves while discharging the shaping material to form a first partial path, the first shaping data containing at least one of discharge amount information representing a discharge amount of the shaping material and movement speed information representing a movement speed of the discharge unit for forming the first partial path;
generate the second shaping data representing a second discharge path along which the discharge unit moves while discharging the shaping material to form a second partial path after the first partial path is formed, the second shaping data containing at least one of discharge amount information representing a discharge amount of the shaping material and movement speed information representing a movement speed of the discharge unit for forming the second partial path;
specify a gap portion sandwiched between the first partial path and the second partial path based on the first shaping data and the second shaping data; and
when the gap portion is specified, change the first shaping data corresponding to the first partial path by dividing the first partial path adjacent to the gap portion into a plurality of partial paths, and increasing a width of each of the partial paths according to change in a width of the gap portion so that the shaping material deposited on the stage in the first partial path increases.

13. The method for manufacturing a three-dimensional shaped object according to claim 1, wherein
the changing of the first shaping data comprises changing the first partial path to pass through a center of each of enlarged widths of the partial paths.

14. The information processing device according to claim 11, wherein
the data generating unit is further configured to change the first shaping data by of changing the first partial path to pass through a center of each of enlarged widths of the partial paths.

15. The three-dimensional shaping device according to claim 12, wherein
the data generating unit is further configured to change the first shaping data by changing the first partial path to pass through a center of each of enlarged widths of the partial paths.

* * * * *